(12) United States Patent
Toyoda

(10) Patent No.: US 6,637,955 B2
(45) Date of Patent: Oct. 28, 2003

(54) SHUTTER DEVICE

(75) Inventor: Yasuhiro Toyoda, Ohmiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/835,585

(22) Filed: Apr. 17, 2001

(65) Prior Publication Data

US 2002/0025167 A1 Feb. 28, 2002

(30) Foreign Application Priority Data

| Apr. 18, 2000 | (JP) | 2000-116489 |
| Apr. 18, 2000 | (JP) | 2000-116490 |
| Apr. 26, 2000 | (JP) | 2000-125865 |
| May 31, 2000 | (JP) | 2000-162308 |

(51) Int. Cl.$^7$ .............................................. G03B 9/40
(52) U.S. Cl. ........................................ 396/484; 396/489
(58) Field of Search ................................. 396/484, 487, 396/489, 492

(56) References Cited

U.S. PATENT DOCUMENTS

| 4,737,808 A | 4/1988 | Toyoda | 354/246 |
| 4,829,329 A | 5/1989 | Toyoda et al. | 354/252 |
| 4,963,908 A | 10/1990 | Toyoda et al. | 354/246 |
| 5,508,773 A | * 4/1996 | Miyazaki et al. | 396/484 |
| 6,164,780 A | 12/2000 | Noto et al. | 353/122 |
| 6,474,880 B2 | * 11/2002 | Toyoda et al. | 396/486 |

FOREIGN PATENT DOCUMENTS

| JP | 35-29651 | 11/1935 |
| JP | 6-26896 | 4/1994 |
| JP | 6-26897 | 4/1994 |
| JP | 2501747 | 4/1996 |

* cited by examiner

Primary Examiner—David Gray
(74) Attorney, Agent, or Firm—Fitzpatrick, Cella, Harper & Scinto

(57) ABSTRACT

A shutter device includes a shutter base plate having a shutter aperture, a plurality of shutter blades, and an arm member arranged to swing on a predetermined shaft provided on the shutter base plate. The arm member is connected to each of the plurality of shutter blades to cause the shutter blades to travel over the shutter aperture when the arm member swings on the shaft. With a distance to the shaft from a connection part located farthest from the shaft among connection parts where the shutter blades are connected to the arm member assumed to be D, the dimension (length) of the shutter aperture in the direction of travel of the shutter blades assumed to be A, and the maximum angle of swing of the arm member assumed to be θ, at least one of the following conditions is satisfied:

0.78 A ≦ D ≦ 0.90 A, and

80° ≦ θ ≦ 94°.

22 Claims, 21 Drawing Sheets

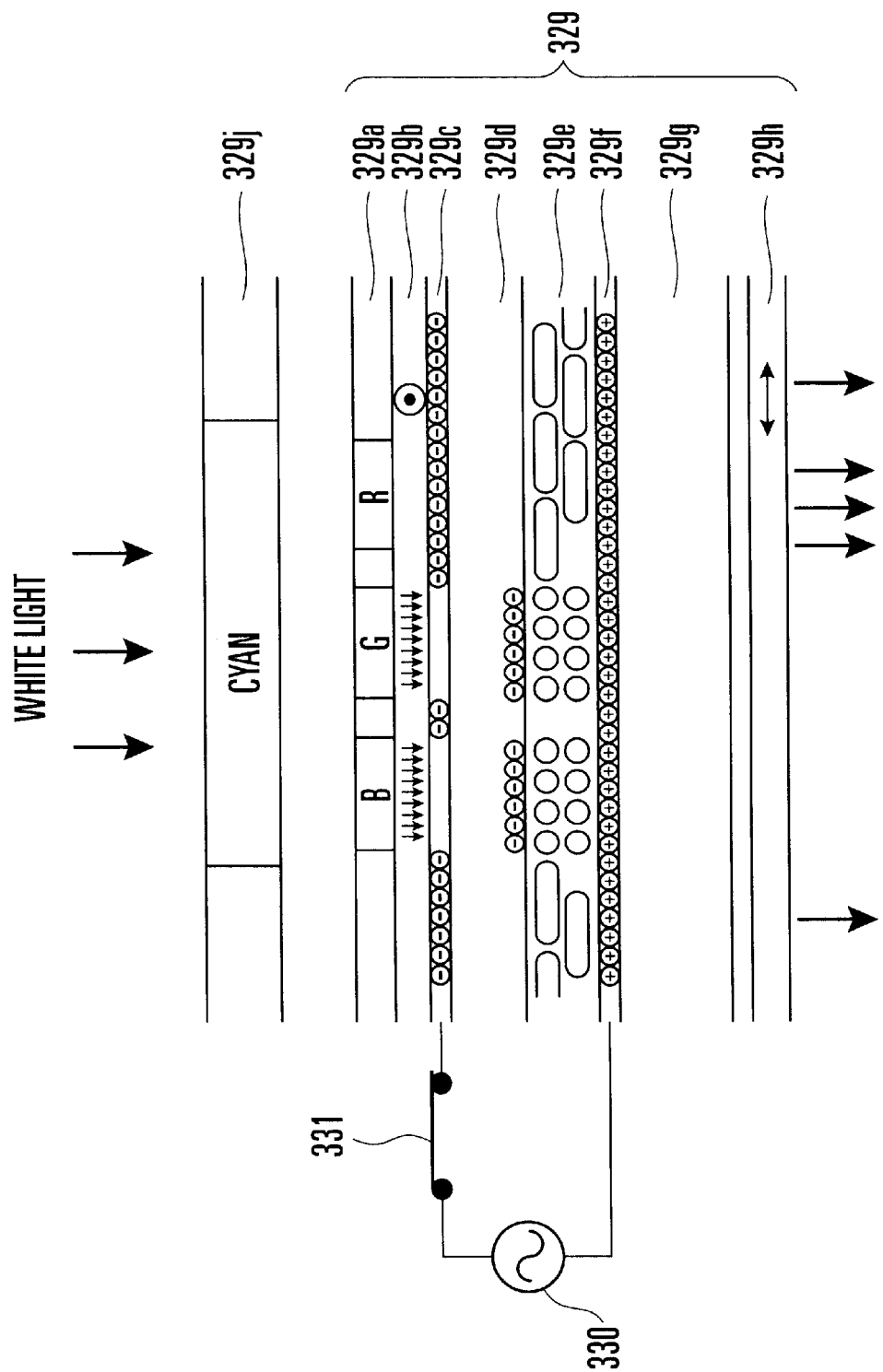

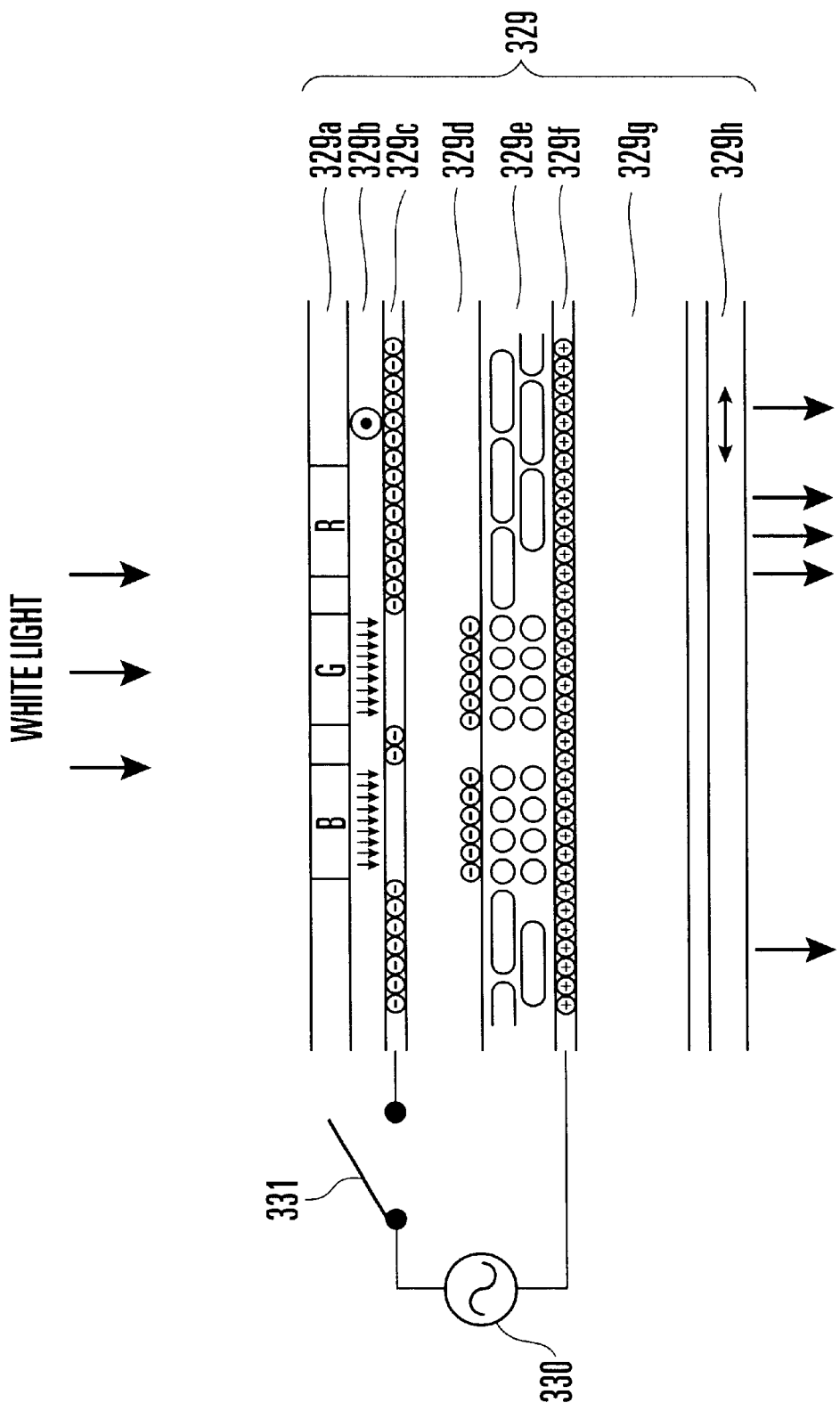

SHUTTER DEVICE

BACKGROUND OF THE INVENTION

1. Field of the Invention

The present invention relates to a shutter device for a camera, an image display apparatus or the like.

2. Description of Related Art

A focal plane shutter of the kind having a plurality of divided blade groups swingably held by parallel link mechanisms each of which consists of two arms is popularly used for a camera or the like. The parallel link mechanisms used for focal plane shutters can be divided into a long arm type and a short arm type. In the long arm type, the base end parts of the arms are swingably mounted on one of two sides of a shutter aperture formed in a shutter base plate. The arms straddle the shutter aperture. The blade groups are interlinked by the fore end parts of the arms on the other side of the shutter aperture. In the short arm type, the base end parts of the arms are swingably mounted on one of two sides of the shutter aperture. The arms interlink the blade groups by their fore end parts on the same one side of the shutter aperture without straddling the shutter aperture.

Among the known focal plane shutters, so-called vertical travel focal plane shutters are most popularly used. Of the vertical travel focal plane shutters, the long arm type focal plane shutter is arranged, as disclosed in Japanese Laid-Open Utility Model Publication No. Sho 35-29651, to swingably hold the blade groups by the arms on the opposite side across the shutter aperture with respect to the base end parts of the arms. Because of this arrangement, the arms become longer than the width of the shutter aperture.

In the long arm type, the arm swinging angle required for opening and closing the shutter aperture with the.blade groups is small. Therefore, the amount of displacement of the blade groups in the direction of orthogonally intersecting the traveling direction of the blade groups for opening or closing the shutter aperture, i.e., in the direction of width, becomes small. The small amount of displacement is advantageous for reduction in size of the shutter. However, in a case where the number of blades to be held by the two arms is arranged to be three or more, the arrangement results in a complex structure. Besides, the use of long arms increases the inertia of the shutter blade unit consisting of the blade groups and the arms. The large inertia is a disadvantage for a high speed travel of the shutter blades.

Therefore, as a result of the recent trend of increasing a shutter speed for an exposure and making flash light emission synchronizing time shorter, the long arm type focal plane shutter has come to be seldom used.

On the other hand, the short arm type focal plane shutter has come to be more popularly used. Although it is more disadvantageous than the long arm type in respect of reduction in width, the short arm type is advantageous in the following points. The two arms are arranged not to straddle the shutter aperture and to be able to swingably hold many blades on the side of the shutter aperture located close to their base end parts. Besides, the inertia of the shutter blade unit can be minimized by arranging the arms to be as short as possible.

FIGS. 19 and 20 show the arrangement and dimensions of the parts of a short arm type focal plane shutter. FIG. 19 shows the short arm type focal plane shutter as in a state of having completed preparation for a travel. FIG. 20 shows it as in a state obtained upon completion of the travel. In the case of this shutter device, the base end part of a first leading-curtain arm 106 and that of a second leading-curtain arm 107 are swingably mounted on shafts 101d and 101e which are provided on a shutter base plate 101 having a shutter opening 101a. These two leading-curtain arms 106 and 107 interlink and carry in a swingable manner a slit forming blade 102 and four cover blades 103, 104, 105 and 105' which jointly form a leading curtain consisting of five blades. These blades are interlinked to form a parallel link by using blade caulking dowels 108a to 108e and 109a to 109e. The base end part of a first trailing-curtain arm 114 and that of a second trailing-curtain arm 115 are swingably mounted on shafts 101f and 101g on the shutter base plate 101. The trailing-curtain arms 106 and 107 swingably interlink and carry a slit forming blade 110 and three cover blades 111, 112 and 113 which jointly form a trailing curtain consisting of four blades. These blades are interlinked to form a parallel link by using blade caulking dowels 116a to 116d and 117a to 117d.

On each of the leading- and trailing-curtain sides, the blade caulking dowels are simply allocated in a moderately arcuate line. The first and second arms are arranged to come close to each other side by side when the leading and training curtains are in a state of overlapping each other. The shutter device described above is hereinafter called a first example of prior art.

A shutter device disclosed in Japanese Laid-Open Utility Model Publication No. Hei 6-26896 is arranged to permit reduction in size by adding a third auxiliary arm (and may be a fourth auxiliary arm) to the two arms in view of that a parallel link consisting of the two arms does not easily permit reduction in size. The shutter device is arranged such that, when the shutter blades are overlapping, support parts of the first and second arms where the slit forming blades are carried by these arms are located within a stowing area between a viewfinder and an aperture window, while the third arm which carries other covering blades is arranged to be located outside of the stowing area, so that an outside lateral dimension of the shutter device can be lessened.

To have three arms within a small space, each arm is arrange to be thin, this shutter device is arranged as follows. In the blade overlapping state, the center of swing of the base end part of a third arm enters in between the center of swing of the base end part of a first arm and the caulking dowel of a third cover blade, and the caulking dowel of the third cover blade on the first arm enters in between the center of swing of the base end part of the first arm and the third cover blade. That shutter device is called a second example of prior art.

Japanese Laid-Open Utility Model Publication No. Hei 6-26897 disclosed another shutter device. The shutter device is arranged to permit reduction in size and to increase the durability thereof. For this purpose, one of two main arms is connected to one of the pivotal support parts of each blade on the other main arm while the other pivotal support part is connected to the other main arm and also to an auxiliary arm. The shutter device is called a third example of prior art.

Japanese Utility Model Registration No. 2501747 disclosed a shutter device. The shutter device consists of slit forming blades arranged to be driven by a first parallel link, cover blades arranged to be driven by a second parallel link. An interlinking distance on the slit forming blade of the first parallel link is arranged to be longer than an interlinking distance on the cover blades of the second parallel link in such a way as to keep the parallelism of the slit forming blades and yet to reduce a space from the shutter aperture to the base end part of each parallel link. The shutter device is called a fourth example of prior art.

Japanese Laid-Open Patent Application No. Sho 53-143314 disclosed a shutter device arranged to reduce the size of a long arm type shutter by reducing a space for stowing shutter blade groups in an overlapped state. For this purpose, arm blades are arranged to function both as arms of a parallel link and as cover blades for blocking light from a shutter aperture. The arm blades are arranged to carry slit blades (slit forming blades) in conjunction with arms and also to cover spaces between other cover blades. The shutter device is called a fifth example of prior art.

Generally, it is advantageous for reduction in size (particularly in width) of a shutter device (focal plane shutter) to arrange the number of blades in each of divided blade groups to be fewer. With the number of blades arranged to be fewer, an area to be occupied by blade interlinking parts becomes less. However, the arrangement to have a fewer number of blades of the blade group results in a less amount of mutual overlapping of blades in covering a shutter aperture of a predetermined size. The less amount of overlapping makes it difficult to adequately block light from the shutter aperture.

In the first example of prior art, the length of arms is short. Besides, the number of leading curtain blades is as many as five. As a result, the blade caulking dowels which are simply aligned are spaced at very short distances. The short spacing distance lessens the design latitude of setting positions where cover blades can be carried in a swingable manner. Therefore, interference takes place within the blade unit. Referring to FIG. 20, the interference includes the interference of the periphery of the base end part 106b of the first arm 106 with the periphery of the second arm 107 located around the blade caulking dowel 109e or the periphery of the cover blade 105', and interference of the periphery of the first arm 106 located around the blade caulking dowels 108e with a peripheral part of the second arm 107 or the periphery of the cover blade 104 or 105 located around the blade caulking dowels 104 and 105. Since the dimension of the shutter aperture in the direction of travel of the shutter blades is fixed, it is impossible to increase the arm swinging angle to a predetermined distance, without increasing the arm swinging angle. Besides, it becomes difficult to adequately keep the overlapping amount of the cover blades over the slit forming blades with the shutter device in a state of spreading blades. The possible extent of reduction in size of the shutter device is thus limited.

In a case where a four-blade arrangement applied to the trailing shutter curtain is likewise applied also to the leading shutter blades, as shown in FIG. 20, the amount of mutual overlapping of blades obtained when the trailing curtain is spread decreases to about 2 mm. Therefore, even if the width of each blade is widened to a maximum degree allowable by the blade stowing space with the leading curtain blades in their mutual overlapping state, the spacing distance becomes shorter with the blade caulking dowels in a simply aligned state. Then, under the restriction of the blade caulking dowels, the latitude allowed to setting the swingably carrying positions of the cover blades decreases like in the case of the five-blade arrangement mentioned above. As a result, interference takes place within the blade unit. For example, as shown in FIG. 19, the interference taking place includes interference of the periphery of the base end part 114b of the first arm 114 with the periphery of the second arm 115 and that of the cover blade 113 located around the blade caulking dowel 117d, and interference of the periphery of the first arm 114 located around the blade caulking dowels 116d with a peripheral part of the second arm 115 or that of the cover blade 112 located around the blade caulking dowels 117c. Therefore, it is impossible to secure a desired amount of blade overlapping of 4 mm, as the blade width cannot be widened more than 1 mm at the most on the side opposite to the direction of blade travel. The arrangement thus dose not permit much reduction in size of the shutter device. (The arrangement of the blade caulking dowels will be described in detail later herein at Para. vi).

In the second example of prior art (the shutter device disclosed in Japanese Laid-Open Utility Model Publication No. Hei 6-26896), a third arm is additionally arranged to carry the cover blade group. The arrangement results in a structure more complex than the ordinary parallel link mechanism using two arms like in the first example of prior art. The operating resistance of the parallel link mechanism increases. The inertia of the blade unit also increases. Besides, the arrangement to have three arms within a limited space makes each arm thinner to weaken the strength of the arm. In addition to these shortcomings, the arrangement to have the support parts of the first and second arms where the slit forming blade is carried located within a stowing area between a viewfinder and an aperture window, when the blades are in an overlapped state, shortens an interlinking distance on the slit forming blade in the parallel link. The shorter interlinking distance makes it difficult to keep an exposure slit at an adequate rate of parallelism.

The third example of prior art (the shutter device disclosed in Japanese Laid-Open Utility Model Publication No. Hei 6-26897) has the same shortcomings as the second example of prior art, namely, the addition of the third (auxiliary) arm for supporting the cover blade group results in a structure more complex than the ordinary parallel link mechanism using two arms like in the first example of prior art, increases the operating resistance of the parallel link mechanism, and also increases the inertia of the blade unit. Although the number of arms is increased to disperse loads on the arms, the arrangement to have three or more arms within a space severely reduced by reduction in size results in use of thinner arms at the expense of strength of the arms.

In the fourth example of prior art (the shutter device disclosed in Japanese Utility Model Registration No. 2501747), two parallel link mechanisms are arranged for one blade unit, and a third arm (and further a fourth arm) is additionally used for supporting the cover blade groups. This results in a structure more complex than the ordinary parallel link mechanism using two arm like in the first example of prior art, increases the operating resistance of the parallel link mechanism, and also increases the inertia of the blade unit. Besides, the arrangement to have three or more arms within a space severely reduced by reduction in size results in use of thinner arms at the expense of strength of the arms.

Each of the first to fourth examples of prior art described above is a short arm type shutter device. However, the end parts on the sides of arm base ends of the slit forming blades of both the leading and trailing curtains (particularly the end parts of slit forming edges on the sides of the arm base ends) are interlinked in such a way as to fittingly penetrate the arms of the blade unit and are not to intrude into the movable range of the driving pins provided on the blade driving lever arranged to drive these arms. This is because, when the shutter blade unit is spread, if the end part of one slit forming blade on the arm base end side is intruding into the movable range of the driving pin on the side of the other blade, there arise the following two problems.

One problem lies in that, in charging the shutter, to retain an adequate light blocking state by not opening the shutter aperture 201a, as shown in FIG. 21, the leading curtain 202 shifts to a state of covering the shutter aperture (a spread state) prior to the trailing curtain 210. At this time, the above-stated intruding state might cause the driving pin 220*a* to interfere with the end part 210*b* of the slit forming blade of the trailing curtain on the arm base end side.

The other problem lies in that, in a case where a function of keeping the trailing curtain 210 at a travel start position fails to be performed despite of charging the shutter due to some trouble or malfunction as shown in FIG. 22, the driving pin 221*a* of the trailing curtain driving lever might come to interfere with the end part 202*b* of the slit forming blade of the trailing curtain 210 on the arm base end side.

Meanwhile, for each of the leading and trailing curtains, arrangement to allow the end part of the slit forming blade on the arm base end side to intrude into the movable range of the driving pin of the blade driving lever connected to the arm of its unit of blades when the blades are in an overlapped state brings about no problem. However, none of the first to fourth examples of prior art (short arm type shutter devices) has such arrangement.

On the other hand, a shutter device which is of the same type as the fifth example of prior art (a long arm type shutter device disclosed in Japanese Laid-Open Patent Application No. Sho 53-143314) can be arranged to allow, for each of the leading and trailing curtains, the end part of the slit forming blade on the arm base end side to intrude into the movable range of the driving pin of the blade driving lever connected to the arm of its unit of blades when the blades are in an overlapped state. For example, FIGS. 12 to 14 of Japanese Laid-Open Patent Application No. Sho 53-143314 show such arrangement.

However, the above-stated arrangement is nothing else but an unintended result of structural arrangement for actuating cover blades by means of pin-slot coupling. The disclosed arrangement is not intended to take the advantage of that the long arm type has a small action angle of arms to allow a larger latitude in setting the movable range of the driving pin of the blade driving lever and much less intended to reduce the size of the shutter in the lateral dimension thereof. By the way, in the case of a short arm type shutter device, if the movable range of the driving pin is excessively close to a corner of the shutter aperture, the allocation of the blade groups becomes difficult. Therefore, if the number of blade groups to be carried by two arms is arranged to be three or more, there arises the above-stated problems including that the structural arrangement becomes complex, a large resistance to actuating the light blocking blades by pin-slot coupling, and a disadvantage for a high speed shutter travel due to a large inertia of the blade unit having the long arms.

Therefore, in the case of each of the second to fifth examples of prior art, a camera, for example, can be hardly arranged to have an exposure time shorter than 1/4000 sec or to have a flash device synchronizing time shorter than 1/200 sec. Further, a shutter charging energy increases for obtaining the same shutter curtain speed. Arrangement to solve these problems results in an increase in size of the camera or makes it difficult to increase the film frame transport speed when the camera is in a continuous phototaking mode.

BRIEF SUMMARY OF THE INVENTION

In view of the problems of prior art described above, it is a first object of the invention to provide a shutter unit which is simply arranged to permit reduction in size and particularly reduction in dimension in the direction orthogonally intersecting the traveling direction of shutter blades. It is a second object of the invention to provide a shutter device arranged to be capable of securing a sufficient blade overlapping amount for blocking light, to have a small inertia of blade units, to have excellent working efficiency and to be suited for a high speed operation.

To attain these objects, a shutter device arranged in one aspect of the invention comprises a shutter base plate having a shutter aperture, a plurality of shutter blades, and an arm member arranged to swing on a predetermined shaft provided on the shutter base plate, the arm member being connected to each of the plurality of shutter blades to cause the shutter blades to travel over the shutter aperture when the arm member swings on the shaft. In the shutter device, with a distance to the shaft from a connection part located farthest from the shaft among connection parts where the shutter blades are connected to the arm member assumed to be D, and the dimension (length) of the shutter aperture in the direction of travel of the shutter blades assumed to be A, the following condition is satisfied:

$$0.78\,A \leq D \leq 0.90\,A.$$

In the shutter device, with the maximum angle of swing of the arm member assumed to be θ, the following condition is satisfied:

$$80° \leq \theta \leq 94°.$$

The shutter device further comprises a second arm member arranged to swing on a shaft which differs from the predetermined shaft and to be connected to each of the plurality of shutter blades. In the shutter device, with a distance between the shaft of the arm member and the shaft of the second arm member assumed to be E and the dimension (length) of the shutter aperture in the direction of travel of the shutter blades to be A, the following condition is satisfied:

$$0.33\,A \leq E \leq 0.39\,A.$$

In the shutter device, with a distance from an end face of the shutter base plate at which the center of swing of the arm member is provided to the end face of the shutter aperture assumed to be B, the shutter device satisfies the following condition:

$$0.56\,A \leq B \leq 0.70\,A.$$

In the shutter device, with a distance from an end face of the shutter base plate at which the center of swing of the arm member is not provided to the end face of the shutter aperture assumed to be C, the shutter device satisfies the following condition:

$$0.24\,A \leq C \leq 0.30\,A.$$

A shutter device arranged in another aspect of the invention comprises a shutter base plate having a shutter aperture, a plurality of shutter blades, and an arm member arranged to swing on a predetermined shaft which is provided as a center of swing on the shutter base plate, the arm member being connected to each of the plurality of shutter blades to cause the shutter blades to travel over the shutter aperture by swinging on the shaft. In the shutter device, with the maximum angle of swing of the arm member assumed to be θ, the following condition is satisfied:

$$80° \leq \theta \leq 94°.$$

Further, in the shutter device, with a distance to the shaft from a connection part located farthest from the shaft among connection parts where the shutter blades are connected to the arm member assumed to be D, and the dimension (length) of the shutter aperture in the direction of travel of the shutter blades assumed to be A, the following condition is satisfied:

$$0.78\,A \leq D \leq 0.90\,A.$$

A shutter device arranged in a further aspect of the invention comprises a shutter base plate having a shutter aperture, a plurality of shutter blades, a first arm member arranged to swing on a predetermined shaft provided on the shutter base plate as a center of swing, the first arm member being connected to each of the plurality of shutter blades, and a second arm member arranged to swing on a shaft which differs from the predetermined shaft, the second arm member being connected to each of the plurality of shutter blades, the plurality of shutter blades being arranged to travel over the shutter aperture when the first and second arm members swing respectively on the shafts. In the shutter device, with a distance between the shaft of the first arm member and the shaft of the second arm member assumed to be E and the dimension (length) of the shutter aperture in the direction of travel of the shutter blades assumed to be A, the following condition is satisfied:

$$0.33\,A \leq E \leq 0.39\,A.$$

A shutter device arranged in a further aspect of the invention comprises a shutter base plate having a shutter aperture, first, second, third and fourth shutter blades, and a first arm member arranged to swing on a predetermined shaft provided on the shutter base plate, the first arm member being connected to, in the order of from the farthest to the nearest to the center of swing of the first arm member, the first, second, third and fourth shutter blades, one by one, and arranged to cause the four shutter blades to travel over the shutter aperture when the first arm member swings on the shaft. In the shutter device, among distances of connection parts where the shutter blades are connected to the first arm member, with respect to a line segment connecting to the shaft the connection part where the first shutter blade is connected to the first arm member, the distance of the connection part connecting the third shutter blade to the first arm member is the longest.

The shutter device further comprises a second arm member which is connected to the first, second, third and fourth shutter blades.

In the shutter device, the second arm member is provided with a recessed part which is formed in such a shape that effectively prevents the second arm member from interfering with the connection part where the third shutter blade is connected to the first arm member.

A shutter device arranged in a further aspect of the invention comprises a shutter base plate having a shutter aperture, a plurality of shutter blades, a first arm member arranged to swing on a predetermined shaft provided on the shutter base plate as a center of swing, the first arm member being connected to each of the plurality of shutter blades, a second arm member arranged to swing on a shaft which differs from the predetermined shaft, the second arm member being connected to each of the plurality of shutter blades, and a driving member arranged to drive the first arm member to swing on the center of swing. In the shutter device, a shutter blade which determines the shape of the shutter aperture among the plurality of shutter blades has the blade end thereof, on the side where the shafts are located, arranged to be located within the driving area of the driving member when all of the plurality of shutter blades are in an overlapped state and to part from the driving area when the shutter blade is in a state of being driven by the driving member.

Further, in the shutter device, the plurality of shutter blades constitute a trailing curtain shutter unit which is arranged to close the shutter aperture, and the shutter device further comprises a leading curtain shutter unit which is arranged to bring the shutter aperture from a closed state to an open state before the trailing curtain shutter unit is driven by the driving member.

The shutter device further comprises second driving means arranged to drive an arm member which is connected to a plurality of shutter blades of the leading curtain shutter unit.

These and further objects and features of the invention will become apparent from the following detailed description of preferred embodiments thereof taken in connection with the accompanying drawings.

BRIEF DESCRIPTION OF THE SEVERAL VIEWS OF THE DRAWINGS

FIGS. 12(a) and 12(b) show the arrangement and operation of an SLM used by the image display apparatus.

DETAILED DESCRIPTION OF THE INVENTION

Hereinafter, preferred embodiments of the invention will be described in detail with reference to the drawings.

First Embodiment

Figure 1:
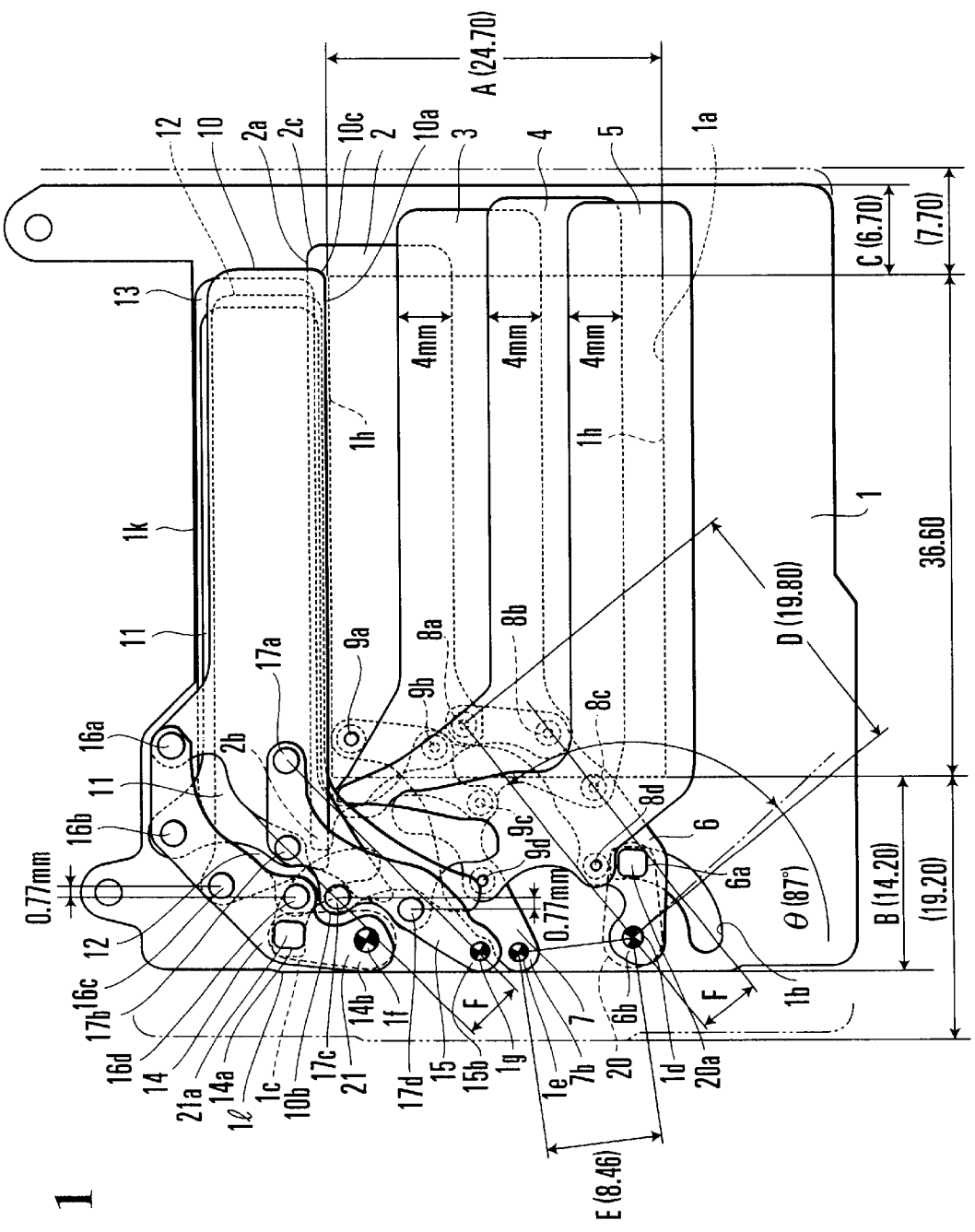
FIG. 1 is a front view showing a focal plane shutter which is a first embodiment of the invention as in a state obtained upon completion of preparing shutter blade groups for a travel.
Figure 2:
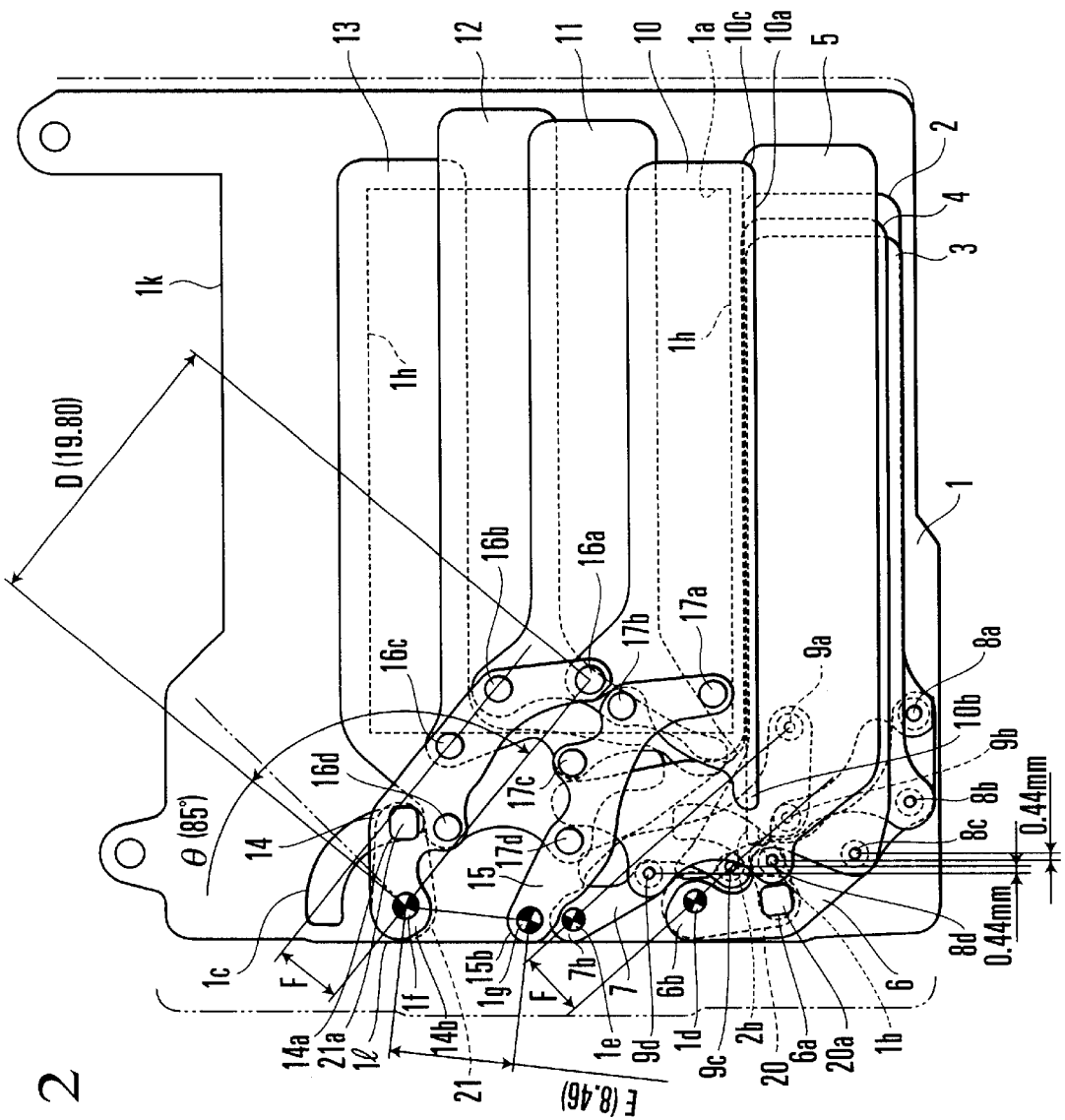
FIG. 2 is a front view showing the focal plane shutter as in a state obtained upon completion of travel of the shutter blade groups.
Figure 3:
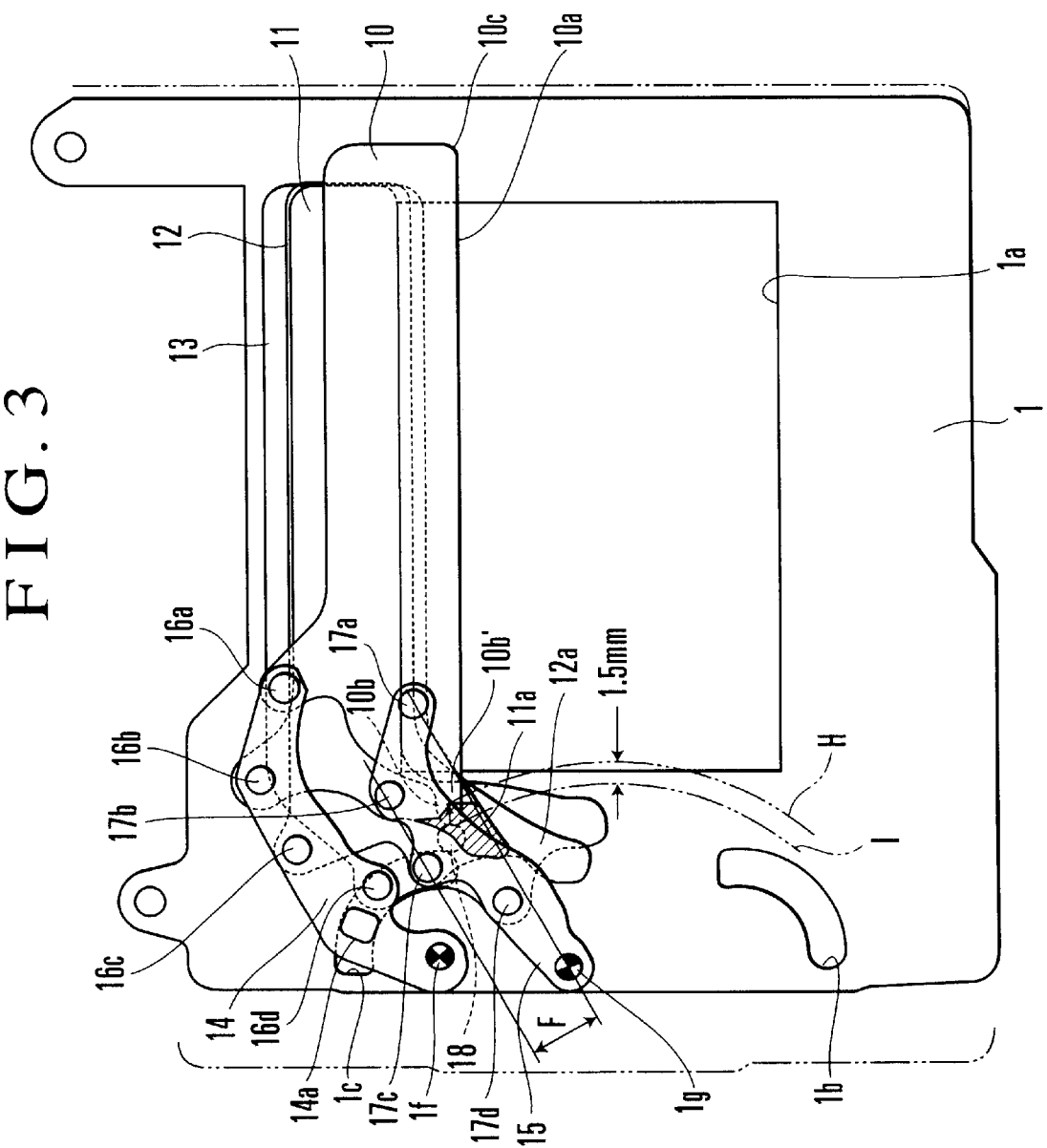
FIG. 3 shows how an advantageous effect is attained according to the blade caulking positions on arms in the focal plane shutter.
Figure 4:
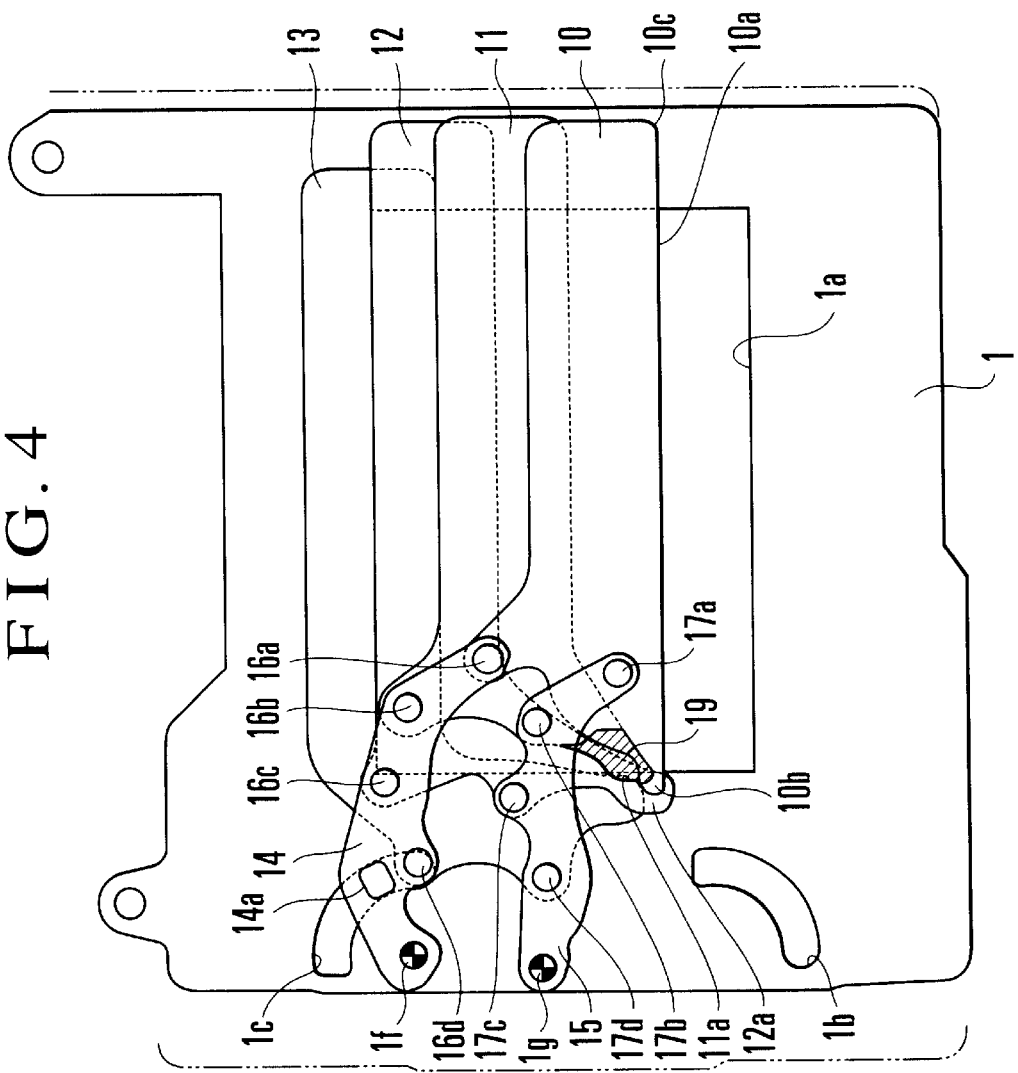
FIG. 4 shows how an advantageous effect is attained according to the blade caulking positions on the arms in the focal plane shutter.

FIGS. 1 to 4 relate to a focal plane shutter which is arranged for a camera as a first embodiment of the invention. FIG. 1 shows the shutter as in a state obtained upon completion of preparation for a travel, i.e., a state before a start of the travel. FIG. 2 shows the shutter as in a state obtained upon completion of the travel. FIGS. 3 and 4 show important points of the shutter as the first embodiment of the invention.

Referring to FIGS. 1 to 4, a shutter base plate 1 is made of a plastic material and is provided with a shutter aperture 1a. The shutter aperture 1a is formed approximately in the middle part of the shutter base plate 1. An arcuate slot 1b is provided in a lower left part of the shutter base plate 1 on the left side of the shutter aperture 1a for escaping the movable area of a driving pin 20a formed on a leading curtain driving lever 20 (a leading curtain driving member). Another arcuate slot 1c is provided in an upper left part of the shutter base plate 1 on the left side of the shutter aperture 1a for escaping the movable area of a driving pin 21a formed on a trailing curtain driving lever 21 (a trailing curtain driving member).

A leading curtain slit forming blade 2 (hereinafter referred to as a leading curtain #1 blade) is arranged to define an aperture shape. The leading curtain slit forming blade 2, or the leading curtain #1 blade 2, has a leading curtain slit forming edge 2a, and an arm base side end part 2b which is formed by extending the leading curtain slit forming edge 2a to the left as viewed on the drawing.

Leading curtain cover blades (leading curtain light blocking blades) 3, 4 and 5 hereinafter will be referred to respectively as a leading curtain #2 blade, a leading curtain #3 blade and a leading curtain #4 blade.

A leading curtain first arm (first leading arm member) 6 has its base end part 6b disposed on the lower side of the left part of the shutter base plate 1 and is swingably mounted on a shaft 1d which is formed in one body with the shutter base plate 1. A left side lower part of the leading curtain slit forming blade 2 is swingably connected to the fore end part of the leading curtain first arm 6 by means of a caulking dowel 8a. A hole 6a is formed in the leading curtain first arm 6 for allowing the driving pin 20a of the leading curtain driving lever 20 to be fittingly inserted therethrough. With the driving pin 20a engaging the hole 6a in this manner (to form an engaging part on the side of the leading curtain), a driving force is transmitted to the leading curtain first arm 6 from the leading curtain driving lever 20 by swinging on a shaft which is the extension of the shaft 1d.

A leading curtain second arm (a second leading curtain arm member) 7 has its base end part 7b disposed at about a vertical middle part of the left side part of the shutter base plate 1 and is swingably mounted on a shaft 1e which is formed in one body with the shutter base plate 1. A left side upper part of the leading curtain slit forming blade 2 is swingably connected to the fore end part of the leading curtain second arm 7 by means of a caulking dowel 9a. A parallel link is thus formed jointly by the leading curtain slit forming blade 2 and the leading curtain first and second arms 6 and 7 for allowing the leading curtain slide forming blade 2 to travel.

The left side parts of the leading curtain cover blades 3, 4 and 5 are swingably connected to the middle parts of the leading curtain first arm 6 and the leading curtain second arm 7 respectively by caulking dowels 8b, 9b, 8c, 9c, 8d and 9d. By this, a parallel link is formed for allowing the leading curtain cover blades 3, 4 and 5 to travel. The radius of swing of the driving pin 20a, i.e., an axis-to-axis distance between the shaft 1d and the driving pin 20a, is set to be shorter than the radius of swing of the caulking dowel 8d for the leading curtain #4 blade which is located closest to the base end of the leading curtain first arm 6, i.e., to be shorter than an axis-to-axis distance between the shaft id and the caulking dowel 8d. A leading curtain unit (a leading curtain blade unit) is thus formed.

A trailing curtain unit is formed similarly to the leading curtain unit. A trailing curtain slit forming blade 10 (hereinafter referred to as a trailing curtain #1 blade) has a trailing curtain slit forming edge 10a, and an arm base side end part 10b which is formed by extending the trailing curtain slit forming edge 10a to the left as viewed on the drawing.

The tailing curtain unit includes trailing curtain cover blades (trailing curtain light blocking blades) 11, 12 and 13, which hereinafter will be referred to as a trailing curtain #2 blade, a trailing curtain #3 blade and a trailing curtain #4 blade.

A trailing curtain first arm (first trailing arm member) 14 has its base end part 14b disposed on the upper side of the left part of the shutter base plate 1 and is swingably mounted on a shaft 1f which is formed in one body with the shutter base plate 1. A left side upper part of the trailing curtain slit forming blade 10 is swingably connected to the fore end part of the tailing curtain first arm 14 by means of a caulking dowel 16a. A hole 14a is formed in the trailing curtain first arm 14 for allowing the driving pin 21a of a trailing curtain driving lever 21 to be fittingly inserted therethrough. With the driving pin 21a engaging the hole 14a in this manner (to form an engaging part on the side of the trailing curtain), a driving force is transmitted to the trailing curtain first arm 14 from the trailing curtain driving lever 21 by swinging on a shaft which is the extension of the shaft 1*f*.

A trailing curtain second arm (a second trailing curtain arm member) 15 has its base end part 15*b* disposed at about a vertical middle part of the left side part of the shutter base plate 1 and is swingably mounted on a shaft 1*g* which is formed in one body with the shutter base plate 1. A left side lower part of the tailing curtain slit forming blade 10 is swingably connected to the fore end part of the trailing curtain second arm 15 by means of a caulking dowel 17*a*. A parallel link is thus formed by the trailing curtain slit forming blade 10 and the trailing curtain first and second arms 14 and 15 for allowing the trailing curtain slide forming blade 10 to travel.

The left side parts of the trailing curtain cover blades 11, 12 and 13 are swingably connected to the middle parts of the trailing curtain first arm 14 and the trailing curtain second arm 15 respectively by caulking dowels 16*b*, 17*b*, 16*c*, 17*c*, 16*d* and 17*d*. By this, a parallel link is formed for allowing the trailing curtain cover blades 11, 12 and 13 to travel. The radius of swing of the driving pin 21*a*, i.e., an axis-to-axis distance between the shaft 1*f* and the driving pin 21*a*, is set to be shorter than the radius of swing of the caulking dowel 16*d* for the trailing curtain #4 blade which is located closest to the base end of the trailing curtain first arm 14, i.e., to be shorter than an axis-to-axis distance between the shaft 1*f* and the caulking dowel 16*d*. A trailing curtain unit (blade unit) is thus formed.

With the focal plane shutter arranged in this manner, in the travel preparation completed state as shown in FIG. 1, the arm-base-side end part 2*b* of the leading curtain slit forming edge 2*a* is located near to the outside of the movable area of the driving pin 21*a*, i.e., at a position where the end part 2*b* overlaps the slot 1*c* of the shutter base plate 1 in the direction of optical axis. The leading curtain slit forming edge 2*a*, therefore, never interferes with the driving pin 21*a* of the trailing curtain driving lever 21. Further, in the travel completed state as shown in FIG. 2, the arm-base-side end part 2*b* of the leading curtain slit forming edge 2*a* comes into the movable area, i.e., the end part 2*b* comes to a position where the end part 2*b* overlaps the slot 1*b* of the shutter base plate 1 in the direction of optical axis.

As for the trailing curtain unit, the arm-base-side end part 10*b* of the trailing curtain slit forming edge 10*a* is located inside of the movable area of the driving pin 21*a*, in the travel preparation completed state of FIG. 1, and is located near to the movable area of the driving pin 20*a* in the travel completed state of FIG. 2 in such a way as to avoid interfering with the driving pin 20*a* of the leading curtain driving lever 20.

In the leading- and trailing-curtain units, the arms 6, 7, 14 and 15 are arranged to be short in length for the purpose of reduction in size of the shutter device. However, so long as the dimension of the shutter aperture 1*a* in the direction of travel of blades is fixed, the swinging operation angles of the arms must be increased in moving the blades to predetermined extents. However, as mentioned in the foregoing, reduction in size of the shutter device by increasing the swinging angle is difficult where the blade caulking dowels 117*b*, 117*c* and 117*d* are arranged to abut on the base end part 114*b* of the first arm 114 and the blade caulking dowels 116*c* and 116*d* when the blades of a blade unit consisting of four blades is in a blade overlapping state as in the case of the first prior art example shown in FIGS. 19 and 20. On the other hand, the first embodiment of the invention is arranged, as shown in FIGS. 1 and 2, to have the caulking dowels 9*b*, 9*c*, 9*d*, 17*b*, 17*c* and 17*d* on the leading- and trailing-curtain second arms 7 and 15 never be abutting on the base end parts 6*b* and 14*b* of the leading- and trailing-curtain first arms 6 and 14 and the caulking dowels 8*d* and 16*d* by allowing them to come into each other. This arrangement of the first embodiment thus effectively permits the arm swinging operation angle to be increased.

Further, it is advantageous for reduction in size to have the caulking dowels 8*c*, 9*c*, 8*d*, 9*d*, 16*c*, 17*c*, 16*d* and 17*d* which are disposed on the side near to the arm base end parts at lease for two blades #3 and #4 of each of leading and trailing curtains, i.e., the blades 4 and 5 or 12 and 13, arranged as close as possible to the left outer side end part 11 of the shutter base plate 1 and along the side end part 11.

Figure 19:
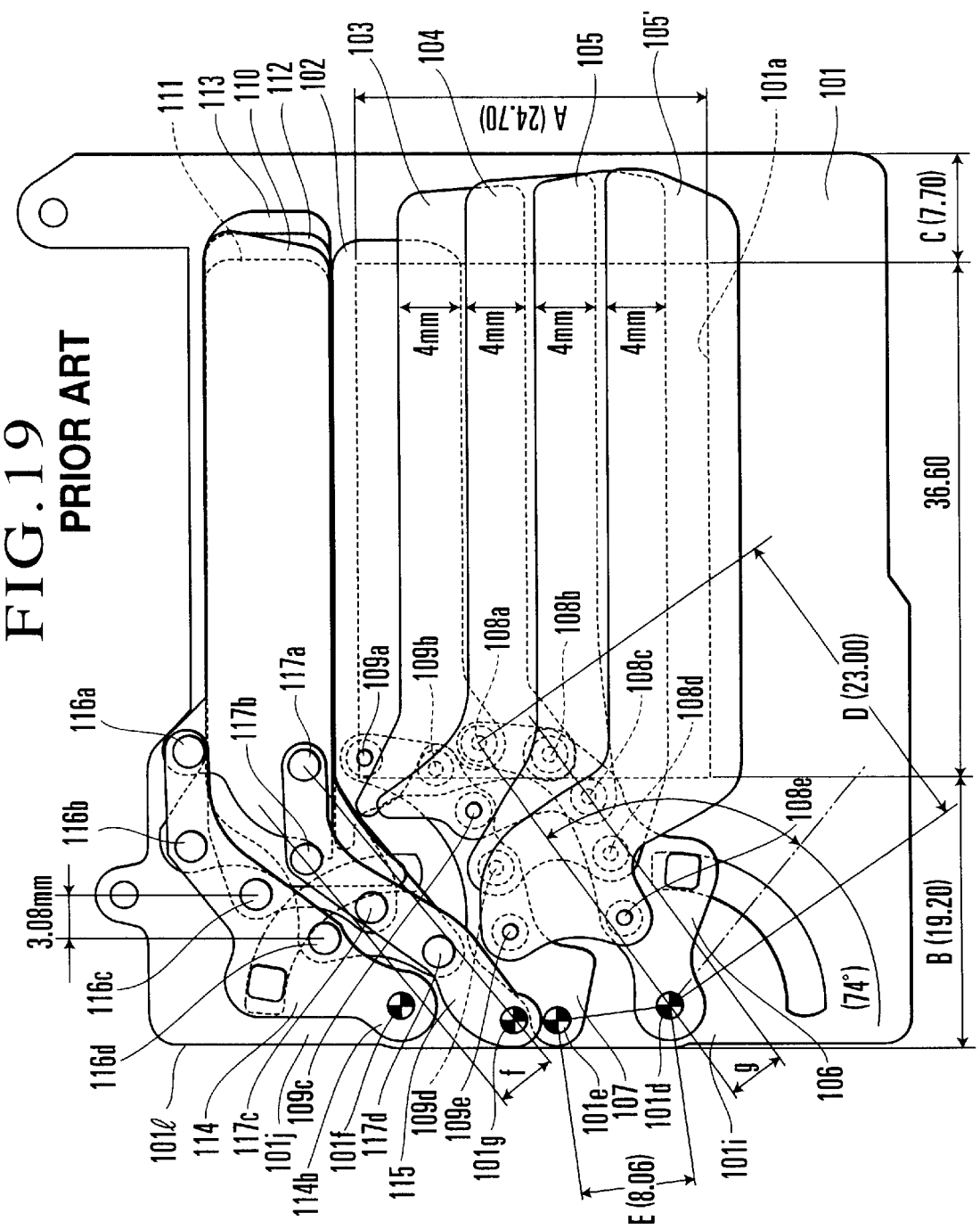
FIG. 19 is a front view showing the conventional focal plane shutter (first example of prior art) as in a state obtained upon completion of travel preparation.
Figure 20:
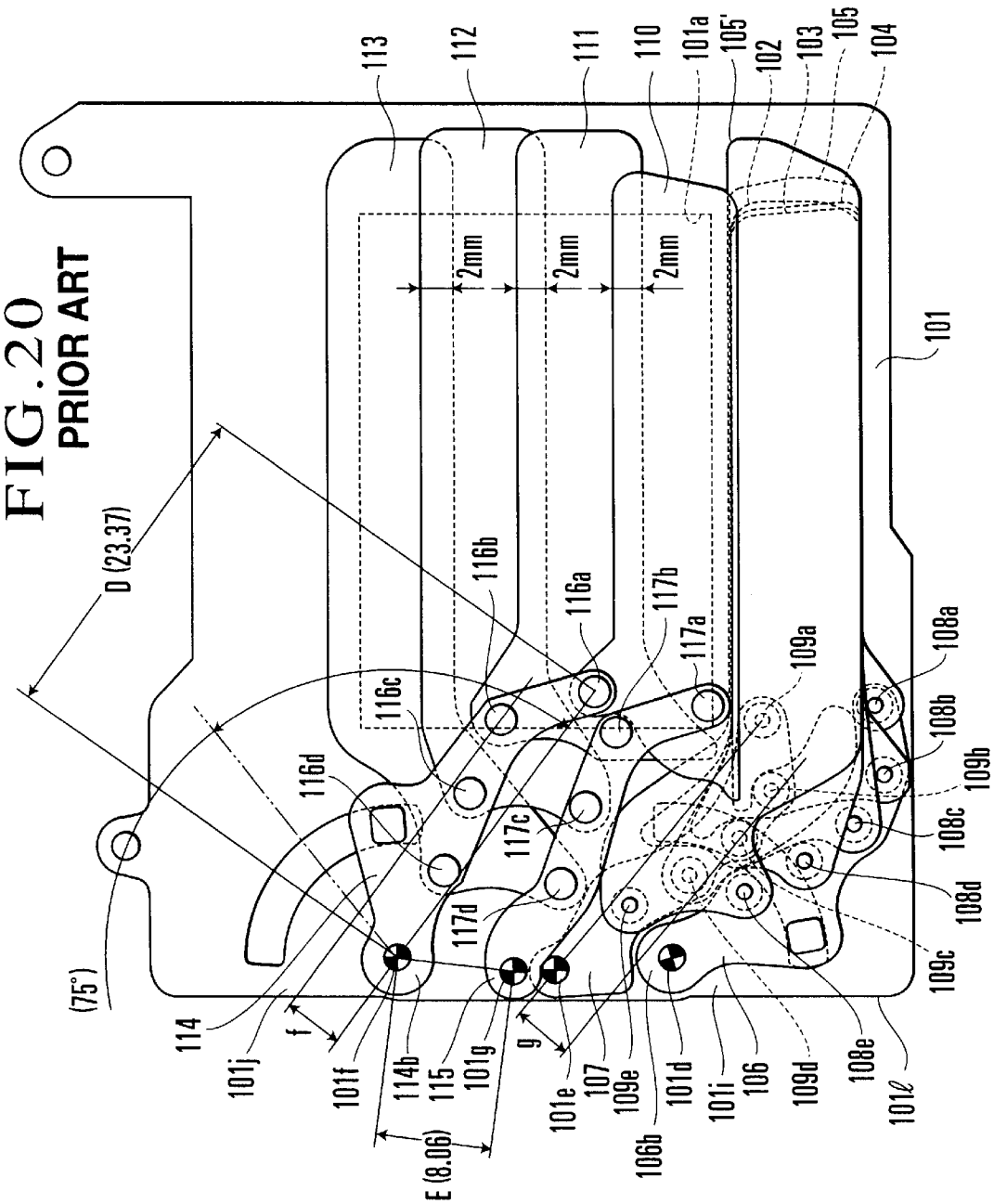
FIG. 20 is a front view showing the conventional focal plane shutter (first example of prior art) as in a state obtained upon completion of travel.

In the case of the first example of prior art shown in FIGS. 19 and 20, the trailing curtain does not permit an arm swinging operation angle. When the shutter device is in its blade overlapping state, the caulking dowels 116*c*, 117*c*, 116*d* and 117*d* of the two blades 112 and 113 disposed on the side near to the arm base end parts cannot be arranged closer to and along the outer side end part 1011 of the shutter base plate. Therefore, the lateral distance between the caulking dowels 116*c* and 116*d* and the lateral distance between the caulking dowels 117*c* and 117*d* are very long measuring as much as 3.08 mm. As a result, the dimension of the whole shutter in the direction of orthogonally intersecting the direction of travel of blades (lateral direction) to become large. It is, therefore, apparent that the reduction in size cannot be attained by arranging the blade caulking dowels in the same manner as the first example of prior art.

The first embodiment of the invention, on the other hand, is arranged as follow. In each of the leading- and trailing-curtain units, the arm base side end part 2*b* or 10*b* of the slit forming edge is arranged to be allowed to come into the movable area of the driving pin 20*a* or 21*a* when the unit is in its blade overlapping state. This arrangement enables the blade caulking dowels, etc., to come into the area of each other. Therefore, the swinging operation angles of the arms 6, 7, 14 and 15 can be much increased. Besides, the caulking dowels 8*c*, 9*c*, 8*d*, 9*d*, 16*c*, 17*c*, 16*d* and 17*d* of the two blades (#3 and #4 blades) disposed on the side near to the arm base parts can be arranged to be located closer to and along the outer side end part 11 of the shutter base plate 1 in the blade overlapping state.

Therefore, in the blade overlapping state, the distances in the lateral direction between the caulking dowels 8*c* and 8*d* and between the caulking dowels 9*c* and 9*d* of the leading curtain unit respectively become 0.44 mm. Further, in the blade overlapping state, the distances in the lateral direction between the caulking dowels 16*c* and 16*d* and between the caulking dowels 17*c* and 17*d* of the trailing unit respectively become 0.77. Further, assuming that the maximum degree of overcharging is 4 degrees, in each of the leading-curtain unit and the trailing-curtain unit, the above-stated distances in the lateral direction in the blade overlapping state can be arranged to be nearly 0 mm (zero). Therefore, the arrangement of the first embodiment of the invention is highly advantageous for reduction in size of the whole shutter in the direction of orthogonally intersecting the direction of travel of the blades (lateral direction).

The operation of the focal plane shutter which is arranged as described above is next described. When the shutter is in the travel preparation completed state as shown in FIG. 1, each of the leading-curtain driving lever 20 and the trailing-curtain driving lever 21 is sucked and held by a shutter time control magnet which is not shown. At this time, the arm base side end part 2b of the leading curtain slit forming edge 2a is located outside of and near to the movable area of the driving pin 21a of the trailing curtain driving lever 21. The end part 2b on the arm base end side of the leading curtain slit forming edge 2a is thus arranged to be prevented from interfering with the driving pin 21a of the trailing-curtain driving lever 21 when the trailing curtain alone travels to close the shutter aperture 1a in the event of such a malfunction that causes the trailing curtain time control magnet to fail to adequately suck and hold the driving lever 21.

Further, at the time of the malfunction, although the arm base side end part 10b of the trailing curtain slit forming edge 10a is located within a movable area of the driving pin 21a, the driving pin 21a moves outside of the movable area of the driving pin 21a at the commencement of the spreading action of the trailing curtain and thus never interferes with the driving pin 21a of the trailing curtain driving lever 21.

When the leading curtain time control magnet is released from its sucking action by a shutter release signal, the urging force of a leading curtain driving spring which is not shown causes the leading curtain driving lever 20 to swing clockwise. The clockwise swing of the lever 20 then drives the first and second arms 6 and 7 of the leading curtain to swing in the same direction.

Then, the leading curtain slit forming blade 2 and the leading curtain cover blades (the leading curtain #2 blade, the leading curtain #3 blade and the leading curtain #4 blade) 3, 4 and 5 which have been in a spread state is caused by the action of the parallel link to travel from above the shutter aperture 1a downward to be overlapped and folded together while keeping the leading curtain slit forming edge 2a and the leading curtain cover blades 3, 4 and 5 in parallel with the major side 1h of the shutter aperture 1a. The leading curtain unit thus opens the shutter aperture 1a as shown in FIG. 2.

After the lapse of time corresponding to a set exposure time with the sucking by the leading curtain time control magnet canceled (released), sucking by the trailing curtain time control magnet is canceled. Then the urging force of a trailing curtain driving spring which is not shown causes the trailing curtain driving lever 21 to swing clockwise. By this, the first and second trailing curtain arms 14 and 15 are driven to swing in the same direction.

Then, the trailing curtain slit forming blade 10 and the trailing curtain cover blades (trailing curtain #2 blade, trailing curtain #3 blade and trailing curtain #4 blade) 11, 12 and 13 which have been in an overlapped, or folded, state is caused by the action of the parallel link to travel from above the shutter aperture 1a downward into a spread state while keeping the trailing curtain slit forming edge 10a and the trailing curtain cover blades 11, 12 and 13 in parallel with the major side 1h of the shutter aperture 1a. The trailing curtain unit thus closes the shutter aperture 1a to terminate an exposure as shown in FIG. 2.

After completion of the exposure, a shutter charging mechanism which is not shown causes the leading-curtain driving lever 20 and trailing-curtain driving lever 21 to swing counterclockwise by allowing the former to swing prior to the latter, in such a way as to leave no slit between the leading and trailing curtains. The leading curtain unit and the trailing curtain unit are thus moved to their positions as shown in FIG. 1.

In this instance, the arm base side end part 10b of the trailing slit forming edge 10a is arranged to be located outside of the movable area of the driving pin 20a, in the travel completed state shown in FIG. 2, so that, when the leading curtain is moved to close the shutter aperture 1a prior to the trailing curtain in charging the shutter, the arm base side end part 10b of the trailing slit forming edge 10a is effectively prevented from coming to interfere with the driving pin 20a of the leading-curtain driving lever 20.

Further, the arm base side end part 2b of the leading slit forming edge 2a is located inside of the movable area of the driving pin 20a in the travel completed state of FIG. 2. However, this part 2b moves to the outside of the movable area of the driving pin 20a upon commencement of the spreading action of the leading curtain (a shutter charging action). Therefore, this part 2b never comes to interfere with the driving pin 20a of the leading-curtain driving lever 20.

The focal plane shutter which is the first embodiment of the invention is adapted for a single-lens reflex camera using a silver-halide film of format 135. In this case, the shutter aperture 1a measures 24.7 mm in the vertical dimension A and 36.6 mm in the horizontal dimension. The size of the shutter aperture 1a is fixed in the case of this format. To reduce the size of the whole shutter, therefore, the component parts around the shutter aperture 1a must be arranged to be smaller.

In view of this, therefore, important points for reduction in size of the shutter are described below on the following assumption. The width of a part of the shutter base plate 1 on the left side of the shutter aperture 1a in the lateral direction (distance between the left end face of the shutter aperture 1a and the left end face of the shutter base plate 1) is assumed to be B. The width of a part of the shutter base plate 1 on the right side of the shutter aperture 1a in the lateral direction (distance between the right end face of the shutter aperture 1a and the right end face of the shutter base plate 1) is assumed to be C. A distance between the center of swing of an arm base end part and the center of rotation of a caulking dowel connecting the slit forming blade 2 or 10 to the fore end part of the arm (length of arm) is assumed to be D. The maximum operating angle round the center of swing of the arm is assumed to be θ. A distance between the base end parts of the first and second arms forming one parallel link is assumed to be E.

(i) The number of blades to be swingably connected to an arm:

In the first embodiment, both the leading and trailing curtains are arranged to be composed of four blades. A predetermined amount of overlapping blades required for light blocking with the leading curtain in a spread state with the camera in a state of having finished film winding charging process (a camera of these days having a built-in motor is arranged to wait for the next shot in this state) is 4 mm in the first embodiment shown in FIG. 1 and is also 4 mm in the case of the first example of prior art. Under this condition, a curtain which is composed of five blades like the leading curtain of the first example of prior art, permits the height of each blade to be arranged smaller than a curtain which is composed of four blades. Besides, a curtain having a larger number of blades permits more easily folding the blades in the overlapping state and thus permits arranging the curtain to be smaller in size in the vertical direction in which the shutter blades travel.

However, the larger the number of blades, the longer the arm becomes as the parts at which the blades are connected to the arm. The larger arm length causes an increase in size in the direction orthogonally intersecting the direction of travel of the blades. Even if the arm length is arranged to be minimized, like in the case of the first embodiment, a space margin on the arm decreases because of the increase of the blade connecting parts. This makes it difficult to reduce the lateral size of the shutter. Further, the amount of overlapping the five blades is larger by on blade than overlapping four blades. A total blade area of the five blade arrangement also increases. Then, with the number of blade connecting parts increased by one, the inertia of the whole blade unit inevitably increases to make it disadvantageous for a high speed travel.

In a case where one shutter curtain is composed of three blades, the number of blade connection parts on one arm decreases to give a larger space margin on the arm. The three-blade arrangement is, therefore, advantageous for reduction in size in the lateral direction of the shutter. However, with respect to the requirement or condition for having a predetermined blade overlapping amount in a blade spreading state (4 mm, for example), the blades cannot be compactly folded together in the blade overlapping state. Therefore, the vertical dimension in which the shutter blades travel becomes larger. An attempt to reduce the vertical dimension would result in an insufficient light blocking power, because the amount of mutual overlapping of blades in a spread state decreases. In the three-blade arrangement, the ratio between the vertical and lateral dimensions of the shutter becomes inadequately balanced for use in a camera.

In order to actually secure an amount of blade overlapping for a sufficient light blocking power and to effectively lessen the lateral dimension by balancing it with the vertical dimension, a four-blade arrangement such as the arrangement of the first is most suited.

(ii) The arm length D:

The arm length D must be set at a minimum length necessary to swingably connect the blade group consisting of four blades, and to allow the vertical dimension A of the shutter aperture 1a to be at a minimum length necessary for making the slit forming blades 2 and 10 sufficiently movable.

(iii) The maximum arm operating angle θ:

With the arm length D minimized as mentioned in Para. (ii), the angle θ must be increased accordingly, in order to enable the slit forming blades 2 and 10 to cover the vertical dimension A of the shutter aperture 1a.

(iv) Distance E between arms:

With the maximum arm operating angle θ increased, if the distance E between the arms is left unchanged, it becomes hardly possible to obtain a sufficiently large operating angle, because the first and second arms interfere with each other and particularly the blade connecting (interlinking) parts interfere among them in spreading and overlapping the blades.

Further, with the arm operating angle increased, the parts of the slit forming blades 2 and 10 on the sides opposite to their arm connecting sides (hereinafter referred to as fore end sides) come to intrude to a greater extent into the shutter aperture 1a when the shutter is in a state close to the blade spreading state or the blade overlapping state. This is caused by the play of fitting engagement of the caulking dowels at the arm connecting parts. The play increases accordingly as the parts of the slit forming blades are located farther from the arm connecting parts. Therefore, this means the degradation in parallelism of the slit forming edges 2a and 10a of the slit forming blades 2 and 10.

The distance E between the first and second arms is enlarged to solve the two points of problem mentioned above. Further, because of the characteristic of the parallel link, a span between the arms which form the parallel link is widened to increase the stability of the parallelism while the slit forming blades held by the arms are in action.

(v) The width C of a part of the shutter base plate 1 on the right side of the shutter base plate 1 in the lateral direction:

With the maximum arm operating angle θ increased by shortening the arm length D, the displacement amount of in the direction orthogonally intersecting the travelling direction becomes larger when the blades (particularly the slit forming blades 2 and 10) are travelling. Therefore, the arrangement to increase the angle θ by shortening the arms is disadvantageous for reducing the lateral width C.

However, the lateral width C can be shortened with the shutter arranged according to the invention as follows. The R (radius) of each of the fore end corners 2c and 10c of the slit forming edges 2a and 10a of the slit forming blades 2 and 10 is minimized to extend the slit forming edge as close as possible to the fore end of the blade in such a way as to minimize the length of the slit forming blade. Further, the fore end of each blade is simply arranged to be in a straight line along the end face of the shutter base plate 1, in such a way as to have the fore end of each blade overlapping the parts of the shutter base plate 1 or those of a cover plate (not shown) around the shutter aperture 1a about to the same extent as the conventional arrangement in the blade spread state to ensure a sufficient light-blocking power and to prevent the blades from being inadvertently pushed out of their positions by the user of the camera.

(vi) The arrangement of caulking dowels connecting blades to arms:

FIG. 3 shows the relation of arrangement of the caulking dowels to the trailing curtain slit forming blade 10. FIG. 4 shows the relation of the arrangement of the caulking dowels to a light blocking action by the trailing curtain. In FIGS. 3 and 4, the trailing curtain is shown as in process of travel. Since the leading curtain unit is of the same structure as the trailing curtain unit, the trailing unit is mainly described below.

Referring to FIGS. 3 and 4, a caulking dowel 18 which is shown in a two-dot chain line is arranged in the same manner as the arrangement of prior art for the trailing curtain #3 blade 12. A light blocking piece 11a is formed on the arm side of the trailing curtain #2 blade 11. A light blocking piece 12a is formed on the arm side of the trailing curtain #3 blade 12.

In the trailing curtain unit of the four-blade arrangement of prior art shown in FIGS. 19 and 20, with respect to a distance from the line segments which connect the centers of swing 101f and 101g at the base end parts of arms to the centers of caulking dowels 116a and 117a located at the fore ends of the arms for the slit forming blade 110, the centers of caulking dowels 116b and 117b for the trailing curtain #2 blade 111 are located farthest (a distance f). A distance to the centers of the caulking dowels for the trailing curtain #3 blade 112 comes next. A distance to the centers of the caulking dowels for the trailing curtain #4 blade 113 is the shortest.

In the leading curtain unit of the five-blade arrangement of prior art shown in FIGS. 19 and 20, with respect to a distance from the line segments which connect the centers of swing 101d and 101e at the base end parts of arms to the centers of caulking dowels 108a and 109a located at the fore ends of the arms for the slit forming blade 102, the centers of caulking dowels 108c and 109c for the leading curtain #3 blade 104 are located farthest (a distance g). The distance decreases in the order of a distance to the centers of the caulking dowels for the leading curtain #2 blade 103, a distance to the centers of the caulking dowels for the leading curtain #4 blade 105, and a distance to the centers of the caulking dowels for the leading curtain #5 blade 105'.

As mentioned in the foregoing, for effectively reducing the lateral dimension of the shutter, it is most preferable to have both the leading and trailing curtains arranged to be composed of four blades. Therefore, with a blade group assumed to be composed of four blades, if the caulking dowels of the first embodiment are arranged in the same manner as the arrangement of the prior art, the arrangement of the caulking dowel 18 for the trailing curtain #3 blade 12 becomes as indicated with a two-dot chain line in FIG. 3. In this case, the arm base side end part 10b of the slit forming edge 10a of the trailing curtain #3 blade 12 would come to interfere with the caulking dowel 18 for the trailing curtain #3 blade 12. To avoid such interference, therefore, the position of the arm base side end part 10b must be shifted about 1.5 mm toward the fore end side of the blade to a position 10b' as indicated by an arrow mark. However, the shift of position causes the outermost locus of motion of the arm base side end part 10b' to come into the shutter aperture 1a, as indicated by a symbol H in FIG. 3, to hinder a slit from being adequately formed for the shutter.

To avoid this, the position of the fore end of the trailing curtain slit forming blade 10 must be arranged to be shifted by about 1.5 mm (to the left as viewed in FIG. 3) by arranging the fore end to be longer by 1.5 mm. Further, since the light blocking piece 11a on the arm side of the trailing curtain #2 blade 11 also comes to interfere with the caulking dowel 18 for the trailing curtain #3 blade 12, the light blocking piece 11a must be arranged to escape the caulking dowel 18. If the light blocking piece 11a is omitted, there arises a clearance 19, as indicated with hatching in the drawing, between the trailing curtain slit forming blade 10 and the arm side light blocking piece 12a of the trailing curtain #3 blade 12. At the clearance 19, light cannot be blocked while the blade unit 2 is acting as shown in FIG. 4. In this state, the shutter does not function. This cannot be avoided by simply increasing the lateral dimension of the shutter approximately by 1.5 mm from that of the first embodiment of the invention. The lateral dimension is thus reducible only to a small extent as compared with the shutter of the first example of prior art.

In the case of the first embodiment, with respect to a distance from the line segments which connect the centers of swing 1f and 1g at the base end parts of arms to the centers of caulking dowels 16a and 17a connecting the trailing curtain slit forming blade 10 to the fore ends of the arms, the centers of caulking dowels 16c and 17c for the trailing curtain #3 blade 12 are located farthest (a distance F). A distance to the centers of the caulking dowels for the trailing curtain #2 blade 11 comes next. A distance to the centers of the caulking dowels for the trailing curtain #4 blade 13 is the shortest.

With the caulking dowels arranged in this manner, the arm base side end part 10b of the slit forming edge 10a in the trailing curtain slit forming blade 10 and the caulking dowel 17c for the trailing curtain #3 blade 12 never interfere with each other. The outermost motion locus of the arm base side end part 10b also never comes into the shutter aperture 1a as indicated by "I" in FIG. 3. Further, the arm side light blocking piece 11a of the trailing curtain #2 blade 11 also never interferes with the caulking dowel 17c for the trailing curtain #3 blade 12. Since the arm side light blocking 11a thus can be adequately formed, light can be blocked without fail while the shutter is in operation.

By virtue of the arrangement described above, the shutter which is the first embodiment can be arranged to have its lateral dimension shorter by 6 mm than the first example of prior art.

The dimensions of various parts are next examined in detail. In the case of the first example of prior art shown in FIGS. 19 and 20, the lateral width B of the part on the left side of the shutter aperture 1a of the shutter base plate 1 is 19.2 mm. This dimension can be lessened by 1 mm or thereabout by curtailing the diameter of the caulking dowels and the marginal allowance to be left between blades during and after their travels. However, no further reduction in dimension B is possible as the arm base side end part of the slit forming edge of the slit forming blade 102 or 110 comes into the inside of the shutter aperture 101a to prevent a rectangular slit to be formed jointly by the slit forming edges of the leading and trailing curtains and the shutter aperture 101a. Therefore, the shutter function can hardly be performed. In order to make the dimension B shorter at least by 2 mm, the shutter must be formed in accordance with the structural arrangement of the invention. According to the invention, the dimension B of the shutter which is the first embodiment and deemed to be in a form close to dimensional balance which is most apposite for reduction in size is 14.2 mm.

In a case where a further reduction in size is required, the material of the swinging shafts 1d, 1e, 1f and 1g of the arm base end parts in the first embodiment is changed to a metal such as a stainless steel or the like from a plastic material which is used for molding them together in one body with the shutter base plate 1, and the shaft diameter is reduced from 1.6 mm to 1.0 mm. Then, the outside diameter of the arm base end part of each of the leading and trailing curtains can be lessened by 0.3 mm. Therefore, the left end face 11 of the shutter base plate 1 can be shifted to the right to that extent as viewed on FIGS. 1 and 2.

In other words, the upper limit value of the dimension B of the first example of prior art can be lessened by 2 mm and the lower limit value of the dimension B of the first embodiment by 0.3 mm. This can be expressed in the following relation:

$$\{(14.2-0.3)/24.7\}A \leq B \leq \{(19.2-2)/24.7\}A \therefore 0.56\,A \leq B \leq 0.70\,A \quad (1)$$

The dimension B of the shutter according to the invention can be freely set within the range of the dimension B shown in Formula (1) above.

The lateral width dimension C of a part of the shutter aperture 1a on the right side of the shutter base plate 1 is next described as follows. In the case of the first example of prior art shown in FIGS. 19 and 20, the dimension C is 7.7 mm. If this value is reduced by as much as 0.3 mm, with 0.3 mm assumed to be a minimum tangible reduction in size, the upper limit dimension becomes 7.4 mm. Since the dimension C is determined by the locus of the fore end of the slit forming blade, the arrangement to increase the maximum arm operation angle θ by reducing the arm length D as in the case of the invention is disadvantageous for reducing the dimension C as it increases the amount of displacement in the direction of orthogonally intersecting the traveling direction of blades (particularly that of the slit forming blade). However, in the case of the shutter which is the first embodiment and is in a form close to the dimensional balance deemed to be most apposite for reduction in size, the dimension C can be set at 6.7 mm.

For a further reduction in size, the R (value) of the fore end corner of the slit forming edge of the slit forming blade is minimized (near to zero) to have the slit forming edge extended as close to the fore end of the blade as possible. By such arrangement, the length on the fore end side of the slit forming blade can be further shortened by 0.7 mm. Then, with the length of the fore ends of the blades other than the slit forming blade likewise shortened approximately by 0.7 mm, the lower limit of the dimension C can be reduced to 6.0 mm. If the dimension C is arranged to be smaller than this value, the slit forming edge comes into the shutter aperture 1a to make the shutter function no longer possible.

Further, such arrangement also makes it hardly possible to ensure that the fore end part of each blade overlap the parts of the shutter base plate 1 or a cover plate located around the shutter aperture 1a to a minimum amount necessary for securing an adequate light blocking power and for preventing the blades from being pushed out of position by some pressure inadvertently exerted by the user when the blades are spread.

Therefore, the dimension C can be expressed by the following relation:

$$(6.0/24.7)A \leq C \leq (7.4/24.7)A \therefore 0.24A \leq C \leq 0.30A \qquad (2)$$

The dimension C of the shutter according to the invention can be freely set within the range of the dimension C defined by Formula (2) above.

Figure 5:
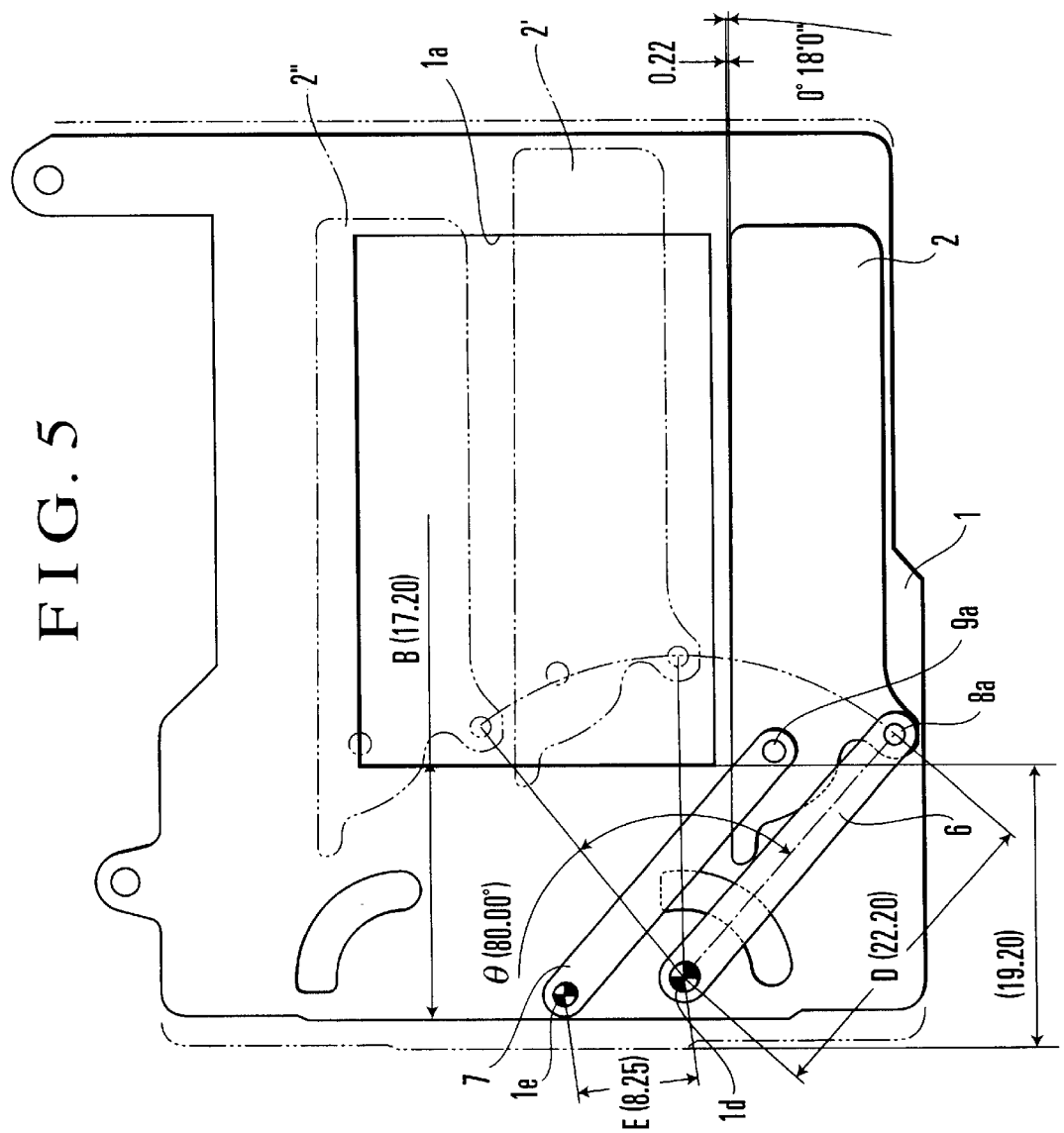
FIG. 5 is a front view showing by way of example a focal plane shutter to which the arrangement of the first embodiment is applied, and shows the example as in a state obtained upon completion of travel, schematically showing a balance between a leading curtain arm and a slit forming blade in respect to the dimensions of a shutter aperture and the inclination of a slit forming part.

The arm length (dimension) D is next described. FIG. 5 schematically shows the leading curtain arms 6 and 7 as balanced with the dimensions of the shutter base plate 1 and the inclination of the slit forming blade 2 after completion of its travel. In FIG. 5, the slit forming blade is shown by a two-dot chain line 2' as has moved to its foremost position and by a two-dot chain line 2" as has moved to its travel preparation completed position. The trailing curtain is omitted from the drawing as it is arranged in a manner similar to the leading curtain.

In the first example of prior art shown in FIGS. 19 and 20, the dimension D is 23.0 mm. With the dimension B 19.2 mm of the first example of prior art lessened by 2 mm as mentioned above, when the invention is used for the same purpose, the dimension D becomes 22.2 mm as shown in FIG. 5. In the case of the shutter which is the first embodiment and considered to have an optimum balance for reduction in size, the dimension D becomes 19.8 mm.

In a case where a further reduction in size is desired, the dimension D can be further reduced by 0.5 mm and the dimension D becomes 19.3 mm. For this purpose, the maximum operating angle θ is increased, the first and second arms which would come to interfere if they are left as they are made to be thinner in shape in such a way as to increase the amount of their escape, the diameter of caulking dowels are also made to be smaller, the restricting conditions of the light blocking pieces, etc., arranged around the arms are eased, and the amount of overlapping to be left between adjoining blades when the blades are in a spread state is minimized.

Figure 6:
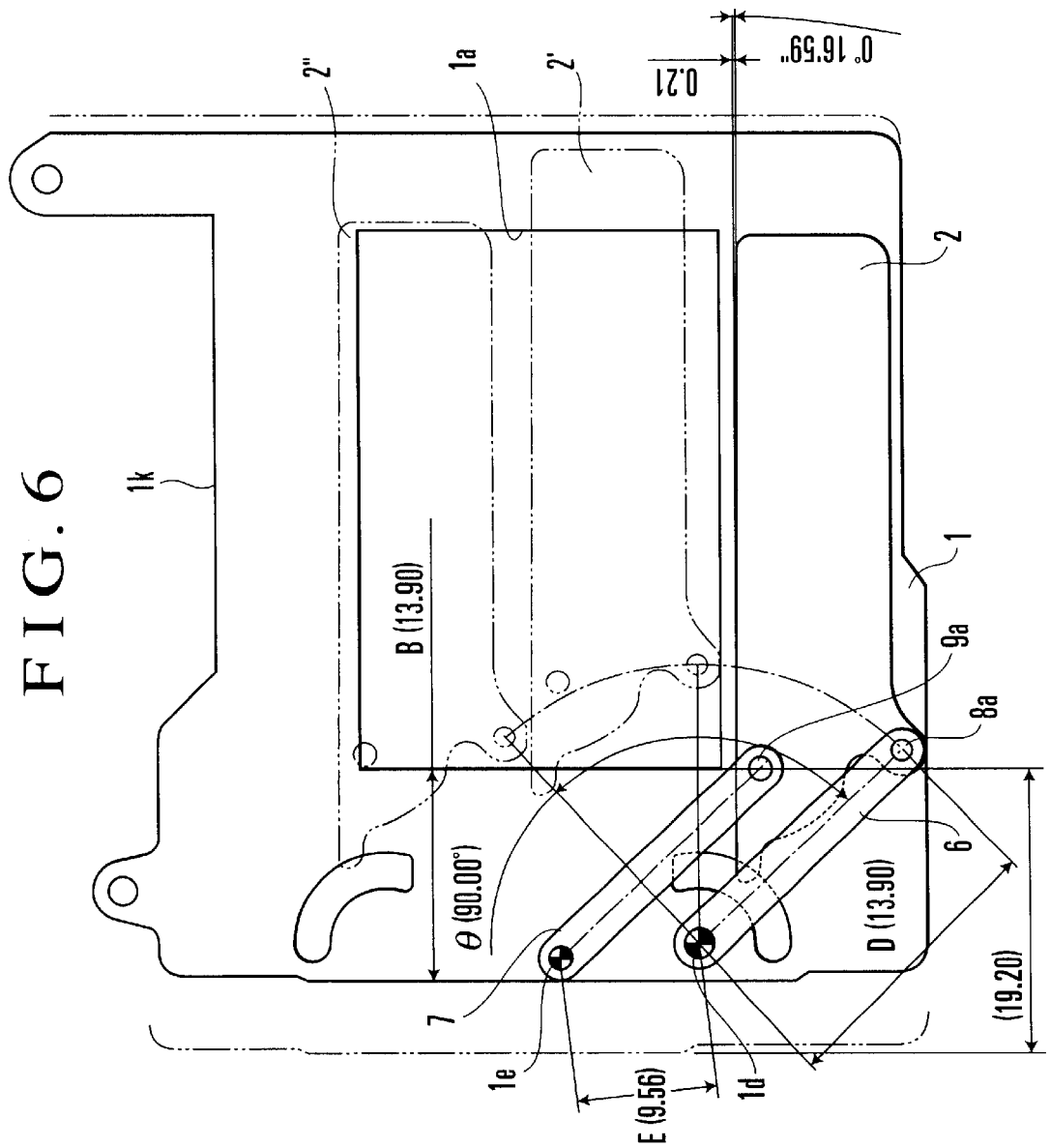
FIG. 6 is a front view showing another example of applying the arrangement of the first embodiment to a focal plane shutter, and shows the example as in a state obtained upon completion of travel, schematically showing a balance between a leading curtain arm and a slit forming blade in respect to the dimensions of a shutter aperture and the inclination of a slit forming part.

FIG. 6 shows a case where the dimension D is set at 19.3 mm. FIG. 6 schematically shows the leading curtain arms 6 and 7 as balanced with the dimensions of the shutter base plate 1 and the inclination of the slit forming blade 2 after completion of its travel. In FIG. 6, the slit forming blade is shown by a two-dot chain line 2' as has moved to its foremost position and by a two-dot chain line 2" as has moved to its travel preparation completed position. The trailing curtain is omitted from the drawing as it is arranged in a manner similar to the leading curtain.

If the dimension D is reduced any further from the value shown in FIG. 6, various problems arise. It becomes no longer possible to adequately support each blade because of a scarce space. With the arms arranged to be thinner in shape and the caulking dowels arranged to have a smaller diameter, these parts come to have insufficient strengths. Besides, light no longer can be adequately blocked and the shutter ceases to function as a shutter.

Therefore, the dimension D can be expressed by the following relation:

$$(19.3/24.7)A \leq D \leq (22.2/24.7)A \therefore 0.78A \leq D \leq 0.90A \qquad (3)$$

The dimension D of the shutter according to the invention can be freely set within the range of the dimension D defined by Formula (3) above.

The maximum arm operating angle θ is described as follows. In the first example of prior art shown in FIGS. 19 and 20, the arm operating angle from the travel completed state to the travel preparation completed state is between 74 and 75 degrees. With an overcharging amount considered to vary from 0 to 4 degrees, the maximum overcharging is assumed to be 4 degree. The total arm operating angle thus becomes 79 degrees.

When the invention is used for the dimension B of 17.2 mm and the dimension D of 22.2 mm, the lower limit value of the maximum arm operating angle θ becomes 80 degrees+overcharge (0 to 4 degrees). In the case of the shutter which is the first embodiment and deemed to be in the dimensional balance close to the optimum balance, the angle θ is 87 degrees+overcharge (0 to 4 degrees). The arrangement to attain further reduction in size as shown in FIG. 6, the angle θ becomes 90 degrees+overcharge (0 to 4 degrees) for the dimension D 19.3 mm.

The maximum arm operating angle θ thus can be expressed by the following relation formula:

$$80° \leq \theta \leq 94° \qquad (4)$$

The maximum arm operating angle θ of the shutter according to the invention can be freely set within the range of the angle θ defined by Formula (4) above.

The increase of the maximum arm operating angle θ, however, comes to limit connecting positions 6a and 14a where the arms 6 and 14 are to be connected to the driving pins 20a and 21a of the leading- and trailing-curtain driving levers 20 and 21 which are arranged to impart traveling energy respectively to the leading and trailing curtains by means of a spring force or the like. More specifically, since the leading- and trailing-curtain driving levers 20 and 21 swing coaxially with the centers of swing of the first arms 6 and 14, the increase of radii of swing of the driving pins 20a and 21a increases the areas to be occupied by the operating loci of the driving pins accordingly as the angle θ is larger. The increase of radii of swing of the driving pins 20a and 21a, therefore, lessens the latitude of blade allocation and is disadvantageous for reduction in size. The radii of swing of the pins, therefore, must be minimized.

Figure 21:
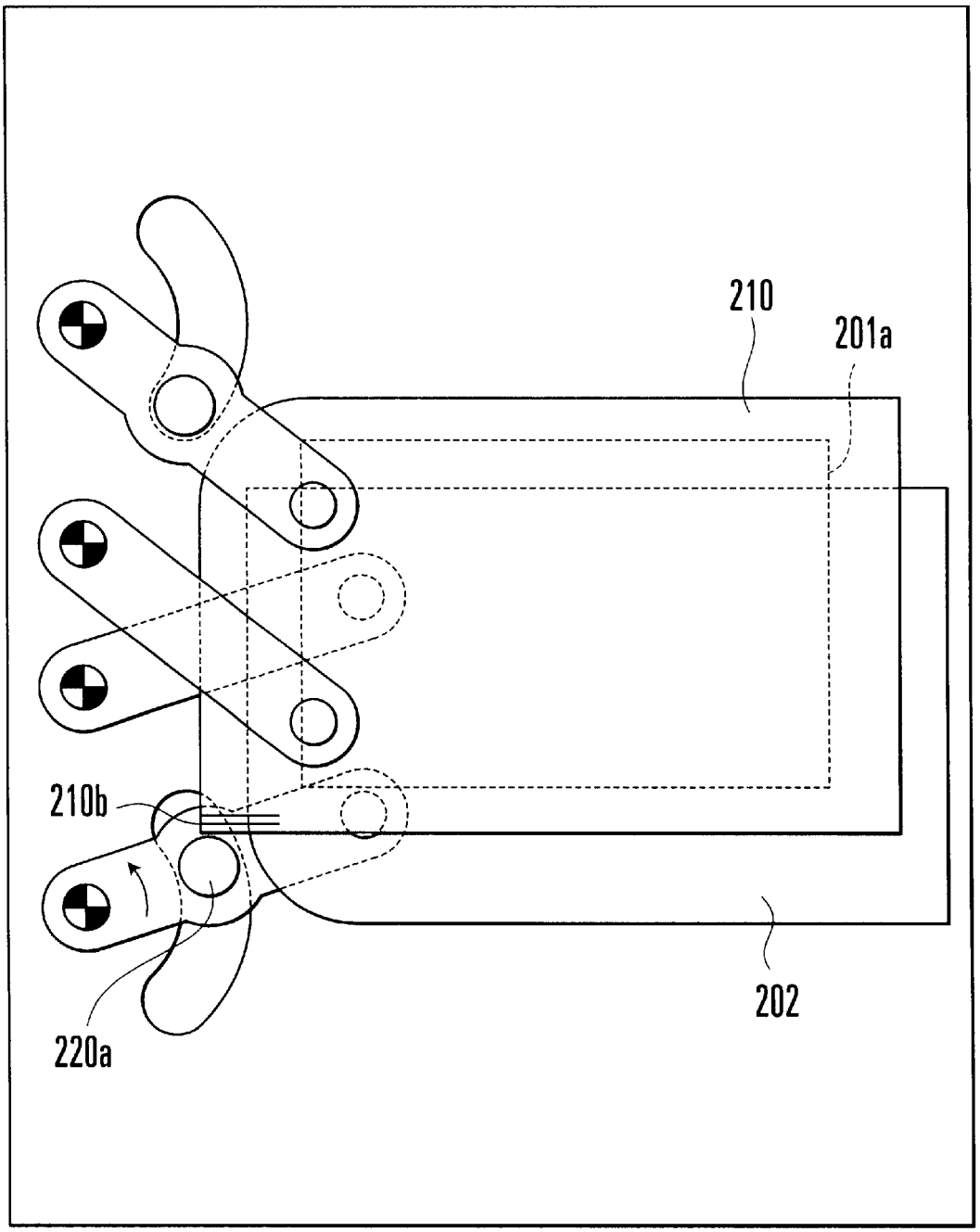
FIG. 21 shows how a trailing curtain slit forming blade and a driving pin interfere with each other in the conventional focal plane shutter.
Figure 22:
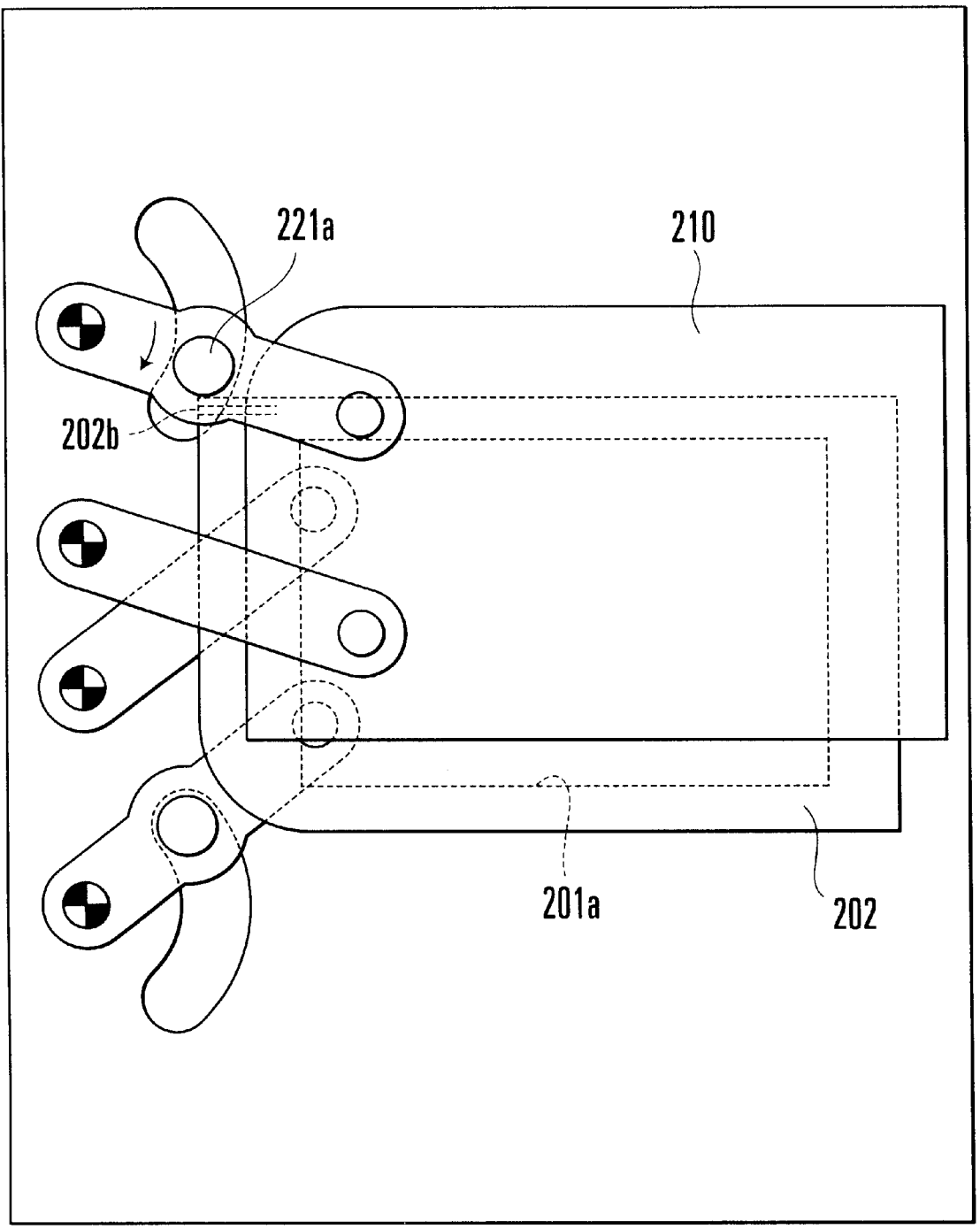
FIG. 22 shows how a leading curtain slit forming blade and a driving pin interfere with each other in the conventional focal plane shutter.

The positions of the driving pins (20a in FIG. 2 and 21a in FIG. 1) obtained in each of a leading curtain travel completed state, a trailing curtain travel completed state and an overcharging state are preferably arranged to be as close as possible to the left side end of the shutter base plate 1. Further, some of cameras of these days has come to be arranged to wind up the film with a rubber coated spool by using a frictional force without using any sprocket for a film transport mechanism. Some of cameras also has come to be arranged to index the film frames by means of a photo sensor, instead of by detecting the amount of rotation of a spool. Therefore, in the case of the shutter mounted as the first example of prior art on the camera which is using a sprocket, escaping parts are formed according to the shape of the sprocket which is disposed across a wall of the camera body in such a way as to extend upward and downward on the left side of the shutter base plate (parts 101i and 101j of FIGS. 19 and 20). On the other hand, however, the shutter of the first embodiment of the invention is mounted on a camera which is provided with a rubber-coated spool does not have to have such escape parts for a sprocket. In the first embodiment, therefore, the radii of swing of the driving pins 20a and 21a are minimized. In addition to that, the shutter is arranged to have the driving pin positions close to the left side end of the shutter base plate 1 in such a way as to have the positions of the driving pins (20a in FIG. 2 and 21a in FIG. 1) located right below the swing center 1d of the first arm 6 on the leading curtain side and right above the swing center 1f on the trailing curtain side in the leading curtain travel completed state, the tailing curtain charging completed state and the overcharging state.

As described above, in the case of the first embodiment of the invention, the radii of swing of the driving pins 20a and 21a which are effective for reduction in size are arranged to be as small as possible to become smaller than those of the caulking dowels 8d and 16d which are provided for the #4 blade located closest to the arm base ends on the first arms 6 and 14. In other words, the movable areas of the driving pins 20a and 21a are arranged to be nearer to the first arm base end (swinging shaft) than the movable area of each of the caulking dowels 8d and 16d on the first arms 6 and 14. In addition to that, the space is effectively used by arranging the arm base side end part 2b of the slit forming edge 2a of the leading curtain slit forming blade 2 to be intruding to a position within the movable area of the driving pin 20a of the leading curtain driving lever 20 where the arm base side end part 2b never interferes with the driving pin 20a when the shutter is in the leading curtain blade overlapping state as shown in FIG. 2. Further, the arm base side end part 10b of the slit forming edge 10a of the trailing curtain slit forming blade 10 is arranged to be intruding to a position within the movable area of the driving pin 21a of the trailing curtain driving lever 21 where this part 10b never interferes with the driving pin 21a when the shutter is in the trailing blade overlapping state shown in FIG. 1 (a position where the driving pin 21a passes in spreading the trailing curtain blades). Reduction in size in the (lateral) direction orthogonally intersecting the direction of travel of shutter blades is thus attained.

Figure 9:
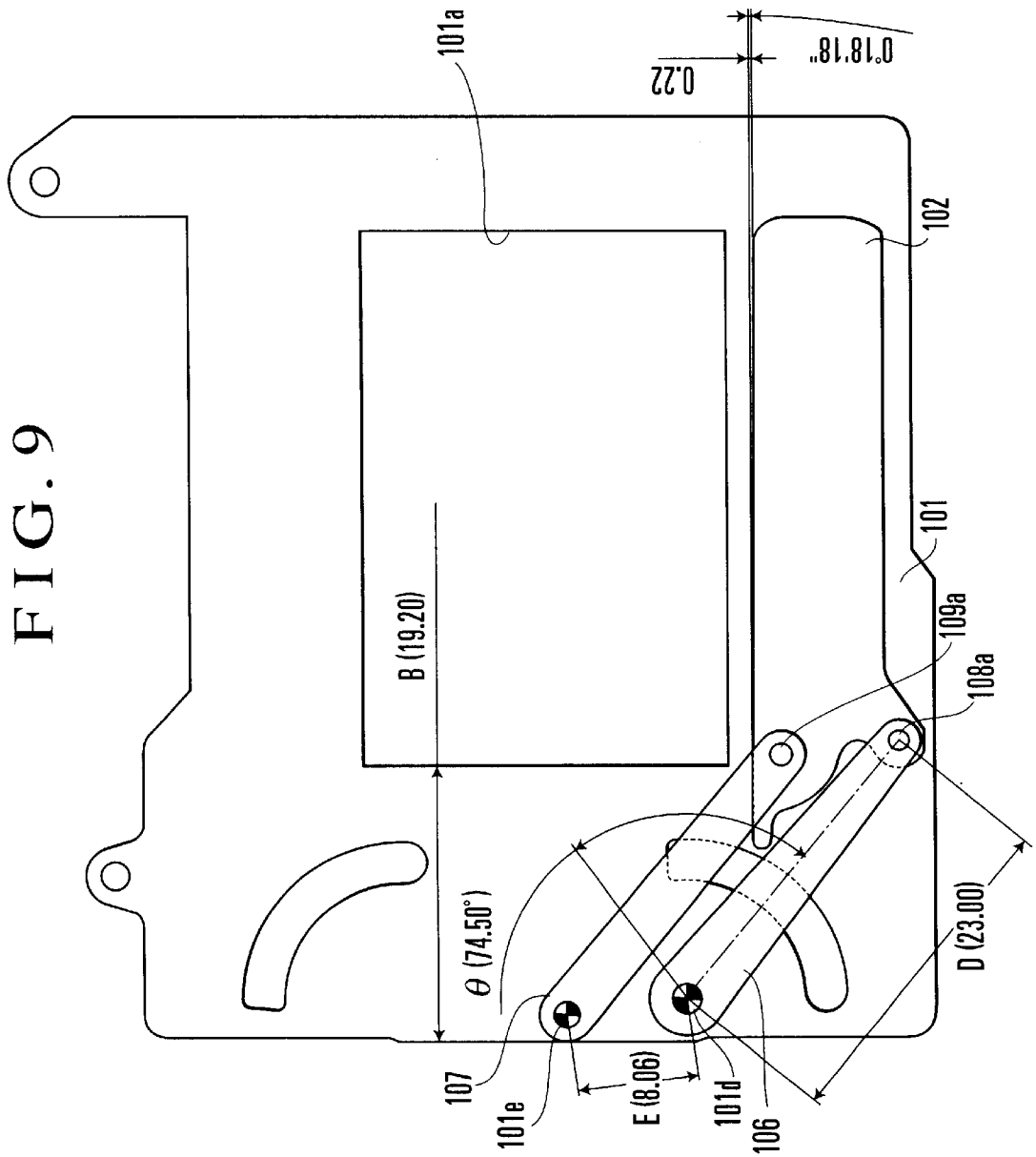
FIG. 9 is a front view of a focal plane shutter as a first example of prior art, schematically showing a balance between a leading curtain arm and a slit forming blade in respect to the dimensions of a shutter aperture and the inclination of a slit forming part obtained upon completion of travel of shutter blades.

The distance E between the first and second arms is next described. In the first example of prior art shown in FIG. 19 and 20, the distance E is 8.06 mm. The parallelism of the slit forming edge (straight line part) is expressed by the slanting angle thereof and a difference in distance in the direction of blade travel (vertical direction as viewed on the drawings) between the two ends of the slit forming edge. The distance E is obtained on the assumption that there is no play at the fitting engagement parts of the swinging shafts 10d, 10e, etc., at the arm base end parts. The fitting engagement of each caulking dowel connecting the slit forming blade to the arm consists of a hole of a grade H8 and a shaft of a grade f8. A maximum play for a diameter $\phi$1.5 mm is 34 $\mu$m. FIG. 9 schematically shows the balance of the leading curtain arms 106 and 107 and the leading curtain slit forming blade 102 with the dimensions of the shutter base plate 101, the inclination of the slit forming edge of the leading curtain slit forming blade 102 obtained in a travel completed state, and the parallelism of the slit forming edge obtained in the travel completed state. The trailing curtain is similar to the leading curtain. The details of the trailing curtain are, therefore, omitted.

As shown in FIG. 9, the slanting angle of the slit forming edge is 0° 18'18" and the difference in distance in the blade travel direction between the two ends of the slit forming edge is 0.22 mm.

With the invention applied for obtaining the dimension B of 17.20 mm, the dimension D of 22.2 mm and the lower limit value of 80° of the maximum arm operating angle $\theta$, in order to retain the slanting angle and the difference in distance in the blade travel direction between the two ends of the slit forming edge at least at the same level as the above-stated values under the same condition of the play (rattling) as the above-stated example of prior art, the distance E becomes 8.25 mm.

Figure 7:
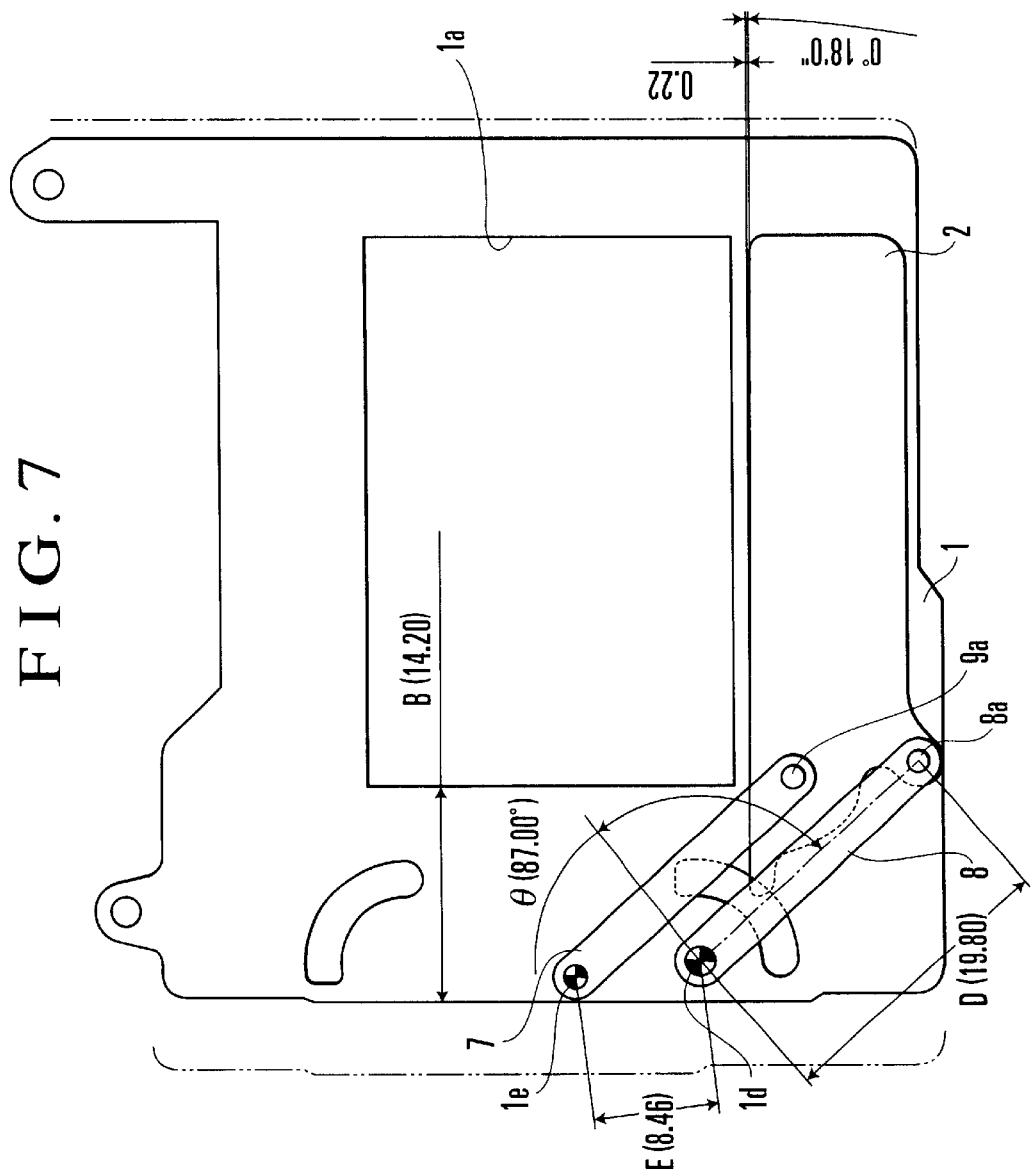
FIG. 7 is a front view of the focal plane shutter which is the first embodiment in a state obtained upon completion of travel, schematically showing a balance between a leading curtain arm and a slit forming blade in respect to the dimensions of a shutter aperture and the inclination of a slit forming part.

In the case of the shutter which is the first embodiment of the invention as is considered to be close to an optimum balanced state for reduction in size, the above-stated distance E becomes 8.46 mm. FIG. 7 schematically shows the balance of the leading curtain arms 6 and 7 and the slit forming blade 2 with the shutter base plate 1 and the inclination of the slit forming edge 2a obtained in the travel completed state. (The trailing curtain is similar to the leading curtain and is, therefore, not shown in FIG. 7.) As shown in FIG. 7, under the same play (rattling) condition as the example of prior art described above, the slanting angle of the slit forming edge is 0° 18'0" and the difference in distance in the blade travel direction between the two ends of the slit forming edge is 0.22 mm. These values indicate some improvement over the example of prior art.

Figure 8:
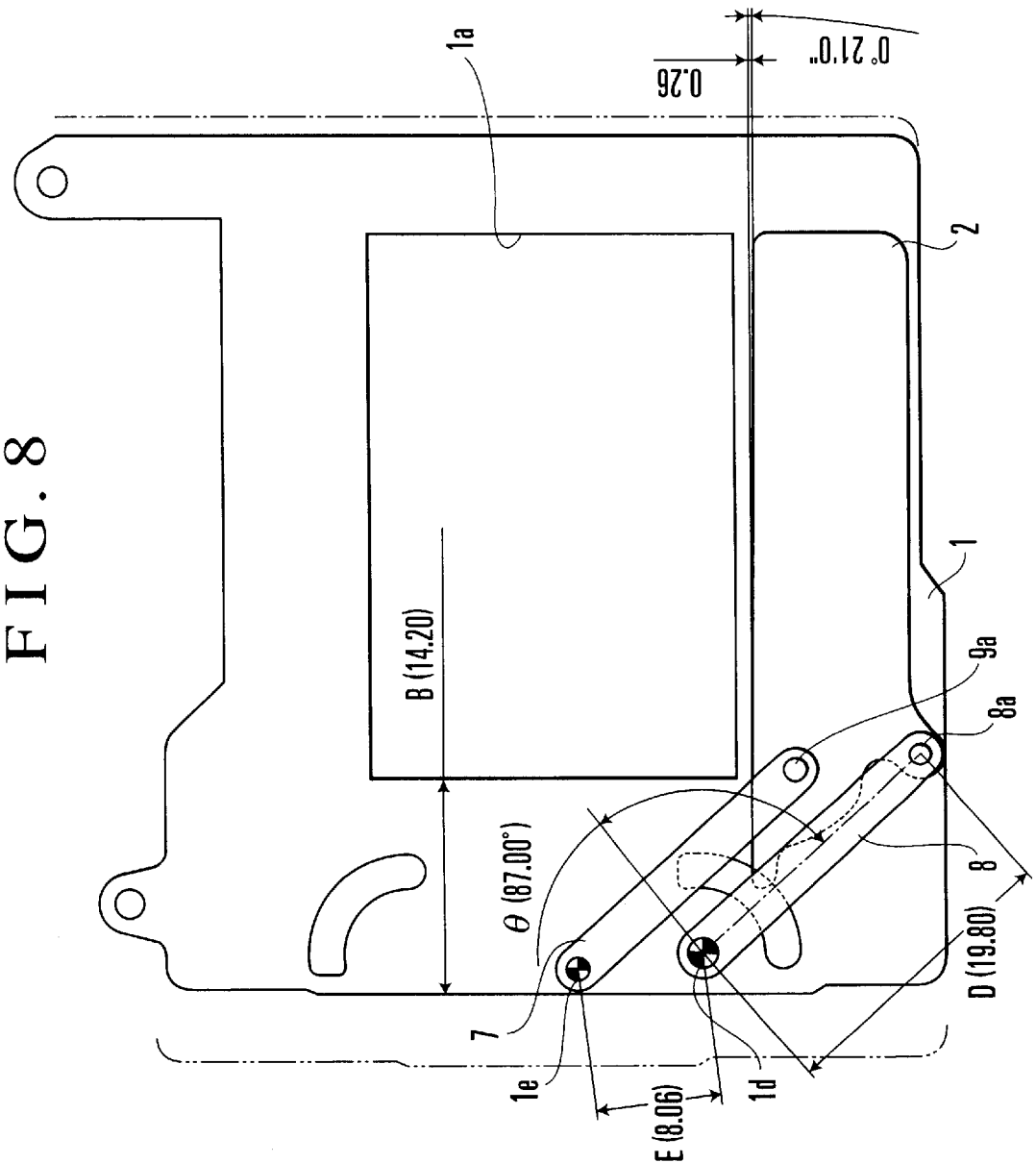
FIG. 8 shows the same state of the focal plane shutter as the FIG. 7 except that a dimension E differs.

Referring to FIG. 8, if the first embodiment is arranged to have the same distance E 8.06 mm as in the example of prior art with other dimensions left the same as FIG. 7, under the same condition of play as the prior art example, the slanting angle of the slit forming edge becomes 0° 21'0" and the distance difference in the blade travel direction between the two ends of the slit forming edge becomes 0.26 mm. These values indicate that the parallelism of the shutter is inferior to the parallelism of the prior art example. This means degradation of the precision of exposure of a picture plane. Therefore, it is apparent that, in order to make the performance of the shutter which is the first embodiment of the invention better than that of the prior art example, the distance E is preferably increased up to 8.46 mm.

In a case where reduction in size is desired to be furthered, the invention is used for the dimension D of 19.3 mm and the upper limit value 94° of the maximum arm operating angle $\theta$. In addition to that, the material of the swinging shafts 1d, 1e, 1f and 1g of the arm base end parts changed from the plastic material molded in one body with the shutter base plate 1 and the shaft diameter is reduced from $\phi$1.6 mm to $\phi$1.0 mm. As a result of this, the outside diameter of the base end parts of the arms of each of the leading and trailing curtains is reduced by as much as 0.3 mm. Then, a vertical distance between the leading and trailing curtains is reduced by 0.3 mm. In addition to this, if it is possible to make the vertical size of the shutter the same as that of the first example of prior art without enlarging the a part 1k which is adjacent to the viewfinder optical path of the camera, the first arms 6 and 14 of both the leading and trailing curtains can be vertically shifted 0.8 mm. Putting such decreases together, the distance E becomes 9.56 mm.

Besides, since the slanting angle of the slit forming edge becomes 0° 16'59" and the difference in distance in the blade travel direction between the two ends of the slit forming edge 0.21 mm under the same condition of play as shown in FIG. 6, these values indicate an improvement over the prior art example.

A further increase of the distance E is not desirable as it would bring about an adverse effect on the viewfinder eyepiece optical path of the camera or would make the vertical dimension of the shutter too large.

Therefore, the distance E can be expressed by the following relation:

$$(8.25/24.7) A \leq E \leq (9.56/24.7) A \therefore 0.33 A \leq E \leq 0.39 A \quad (5)$$

In the shutter according to the invention, the distance E can be freely selected within the range of the distance E defined by Formula (5) above.

In the foregoing description, the dimension B of the lateral width on the left side part of the shutter base plate 1, the dimension C of the lateral width on the right side part of the shutter base plate 1, the arm length D, the maximum arm operating angle θ and the distance E between the first and second arms have been described as to be individually selectable within the ranges defined respectively by Formulas (1) to (5). As shown in FIGS. 5, 6 and 7, however, these values must be decided in such a combination that gives good balance. Further, the dimension D and the angle θ are important for reduction in size. The distance E is adjusted to avoid interference of caulking dowels and for maintaining the parallelism of the slit forming blade. Further, the allocation of the caulking dowels is adjusted also to avoid interference of caulking dowels etc., and to secure an adequate light blocking power by retaining a sufficient amount of overlapping the blades. The dimensions B and C are derived from the values D, θ and E.

In the first embodiment, to prevent operation interference, the movable area of the part where the driving levers 20 and 21 engage each other is arranged to be used in common, with a time difference, as the movable areas of the arm base side end parts 2b and 10b of the slit forming blades 2 and 10. This arrangement permits the extending amounts of arm base side end parts of the slit forming edges 2a and 10a which can be also effectively used for reduction in size. This arrangement permits not only shortening the arm length of the short arm type having a large arm swinging angle but also adjustment to avoid interference of the caulking dowels and securing a sufficient amount of overlapping blades for blocking light. Further, the parallelism of the exposure slit can be prevented from deteriorating by increasing the arm linking distance. Besides, the shutter can be compactly arranged to lessen an operation resistance and inertia for a high speed operation, without making the structural arrangement of the leading and trailing curtain units complex. The arrangement effectively permits reduction in size and particularly in the direction orthogonally intersecting the direction of travel of the shutter blades.

Further, if the shutter curtain speed does not have to be increased by taking the advantage of the small inertia of the leading and trailing curtain units and that the conventional curtain speed is acceptable, the necessary amount of shutter charging energy decreases to permit simplification of a shutter charging mechanism and reduction in thickness of the shutter, so that the camera can be compactly arranged. Further, the arrangement of the first embodiment is advantageous for increasing the frame shifting speed when the camera is in a continuous photo-taking mode.

Second Embodiment

FIGS. 10 to 18 relate to a second embodiment of the invention, which is a shutter device for an image display apparatus. The image display apparatus is adapted for a photo stand or an electronic album and arranged to display images taken and recorded on a film. The image display apparatus is arranged to have a negative image optically projected on a display screen. The screen is composed of a spatial light modulator (hereinafter abbreviated to SLM) which is capable of inverting negative images to enable the user to easily view images recorded on a negative film. A ferroelectric liquid crystal element (hereinafter abbreviated to FLC) is used for the liquid crystal element of the SLM. The memorizing property of the FLC is utilized to instantly write a negative image into the SLM by means of a flash device used for a camera or the like. The image is then read out with light to be observed by the user.

Figure 10:
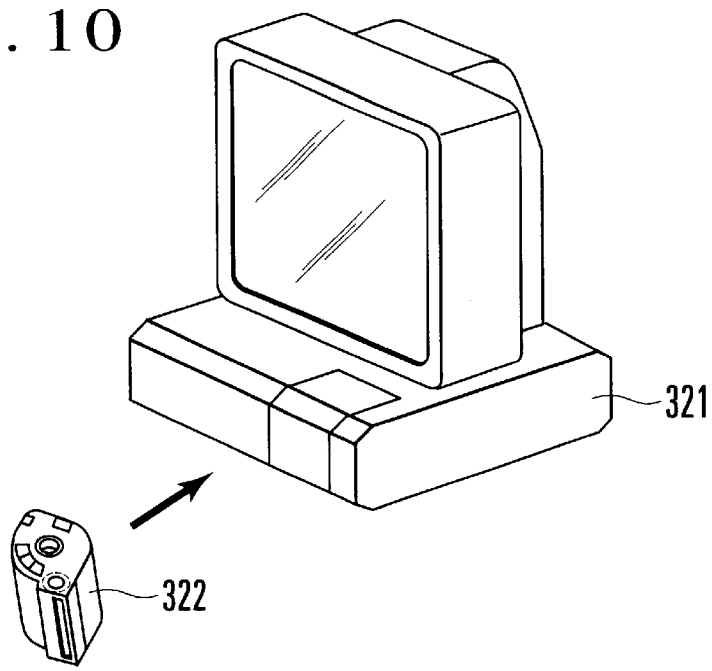
FIG. 10 shows an imaginary operation of an image display apparatus using a shutter device arranged as a second embodiment of the invention.

FIG. 10 is a conceptual view showing an image display apparatus 321 in the second embodiment. A developed IX240 film 322 (hereinafter referred to as a D cartridge) is loaded on the image display apparatus 321 as the negative film. The image display apparatus 321 then reverses the negative image on the film into a positive image to be displayed with a high degree of definition.

Figure 11:
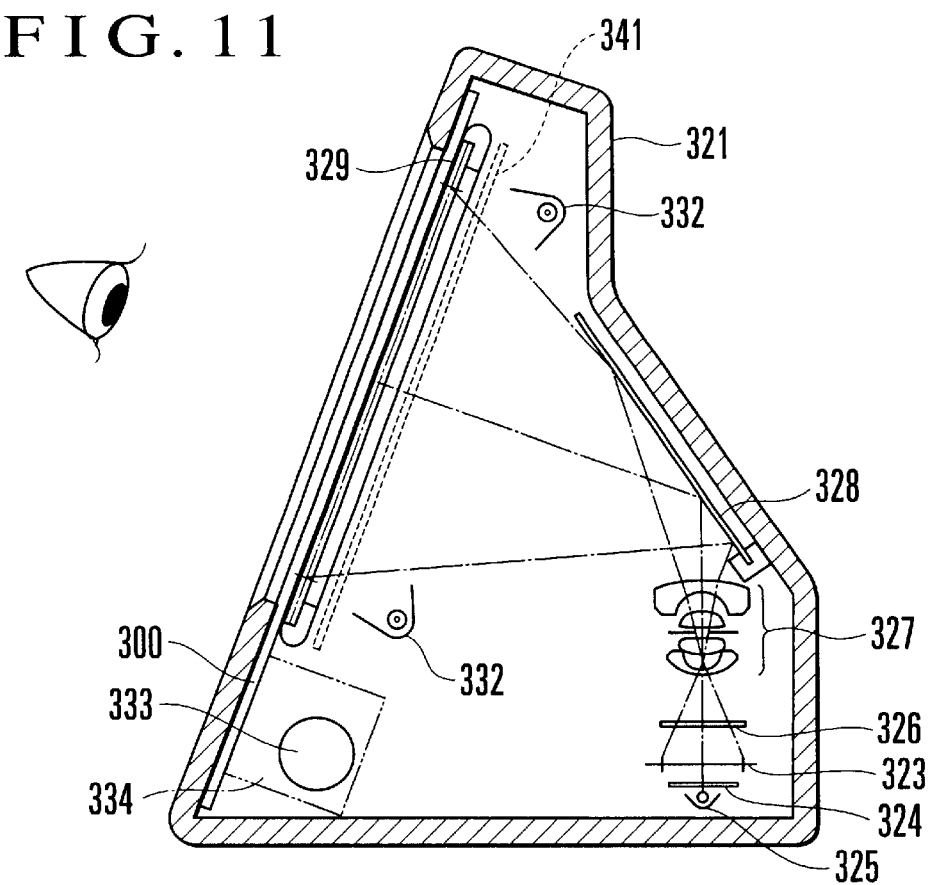
FIG. 11 shows the internal arrangement of the image display apparatus shown in FIG. 10.

FIG. 11 is a sectional view of the image display apparatus 321. Referring to FIG. 11, a developed negative film 323 on which images are recorded by photo-taking shots is pulled out from the D cartridge 322. The frames of the film are indexed one by one to be brought to a position as shown in FIG. 11 by means of a film transport mechanism (not shown).

A diffusing plate 324 which is in a milky white color is arranged to diffuse light emitted from a flash device 325 to uniformly illuminate the negative film 323.

The flash device 325 is of the kind generally used for a camera or the like and is composed of a xenon lamp, a reflector, a light emission circuit, etc. The flash device 325 is arranged to emit light in response to a trigger signal from a microprocessor (not shown).

An orange-base removing filter 326 is arranged to remove the color of an orange base from the negative image. The filter 326 is composed of an optical filter having a blue color complementary to an orange color.

A projection lens 327 is arranged to project a negative image of the negative film 323 at a predetermined enlarging magnification on a photoelectric conversion layer of the SLM 329 through a reflection mirror 328.

The details of the SLM 329 are shown in FIGS. 12(*a*) and 12(*b*). FIG. 12(*a*) shows the SLM 329 in a state obtained in writing an image. FIG. 12(*b*) shows the SLM 329 in a state for image observation.

A color filter 329a is either a filter of pure colors or of complementary colors. For the image display apparatus, the color filter 329a is preferably a fine-mesh filter generally used for the image sensor (CCD) of a video camera as it permits observation without deteriorating a silver-halide image.

Polarizing plates 329b and 329h are arranged to have a liquid crystal layer sandwiched between them. The polarizing direction of the polarizing plate 329b is perpendicular to the drawing plane of FIG. 12(*a*) and that of the other polarizing plate 329h is in the lateral direction of the drawing plane of FIG. 12(*a*). In other words, the polarizing plates 329b and 329h are arranged to have the so-called crossed Nicols structure.

The SLM 329 includes transparent conductive films 329c and 329f (hereinafter referred to as ITO films). The ITO films 329c and 329f are normally made of indium oxide or the like. An AC power source 330 and a circuit (not shown) provided for driving the AC power source 330 are arranged to apply potentials of opposite polarities to the ITO films 329c and 329f through a switch 331.

A photoconductor layer 329d is composed of a photodiode layer with an amorphous film or OPC (organic semiconductive film) or the like. One side of the photoconductor layer 329d is in tight contact with the ITO film 329c and the other side to an FLC 329e.

The FLC 329e is a liquid crystal layer. One side of the FLC 329e is in tight contact with the photoconductor layer 329d while the other side is in tight contact with the above-stated ITO film 329f.

A glass part 329g is arranged to seal the liquid crystal layer and also to protect other layers.

A negative film 329j is an imaged representation of the pixels of the negative film 323 projected by the projection lens 327.

Again referring to FIG. 11, an illumination means 332 is of a linear type (hereinafter referred to as a reading light source). A shutter device 300 is disposed in front of the SLM 329 on the side of the observer.

Figure 13:
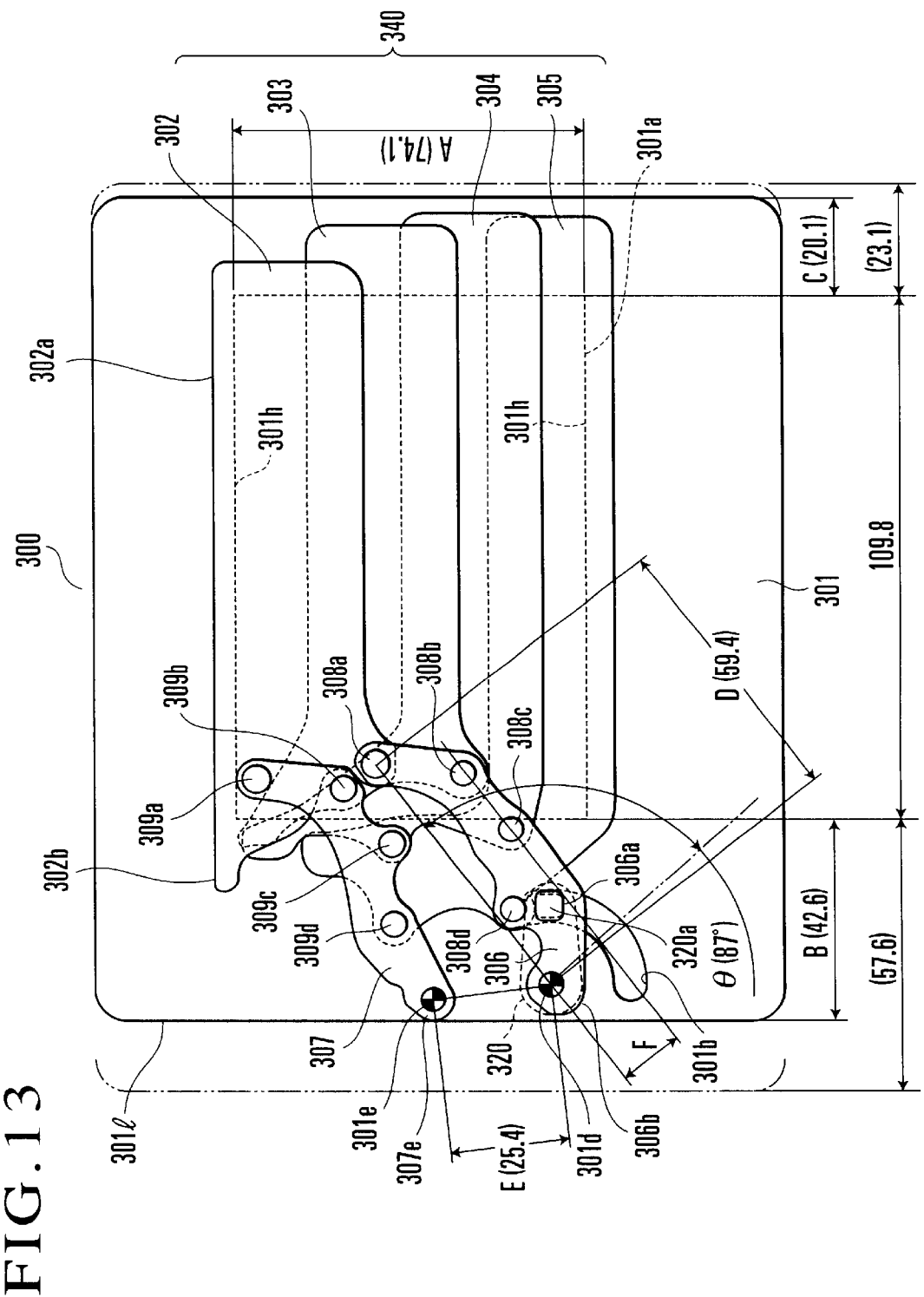
FIG. 13 is a front view showing the shutter device which is a second embodiment as in a closed state.
Figure 14:
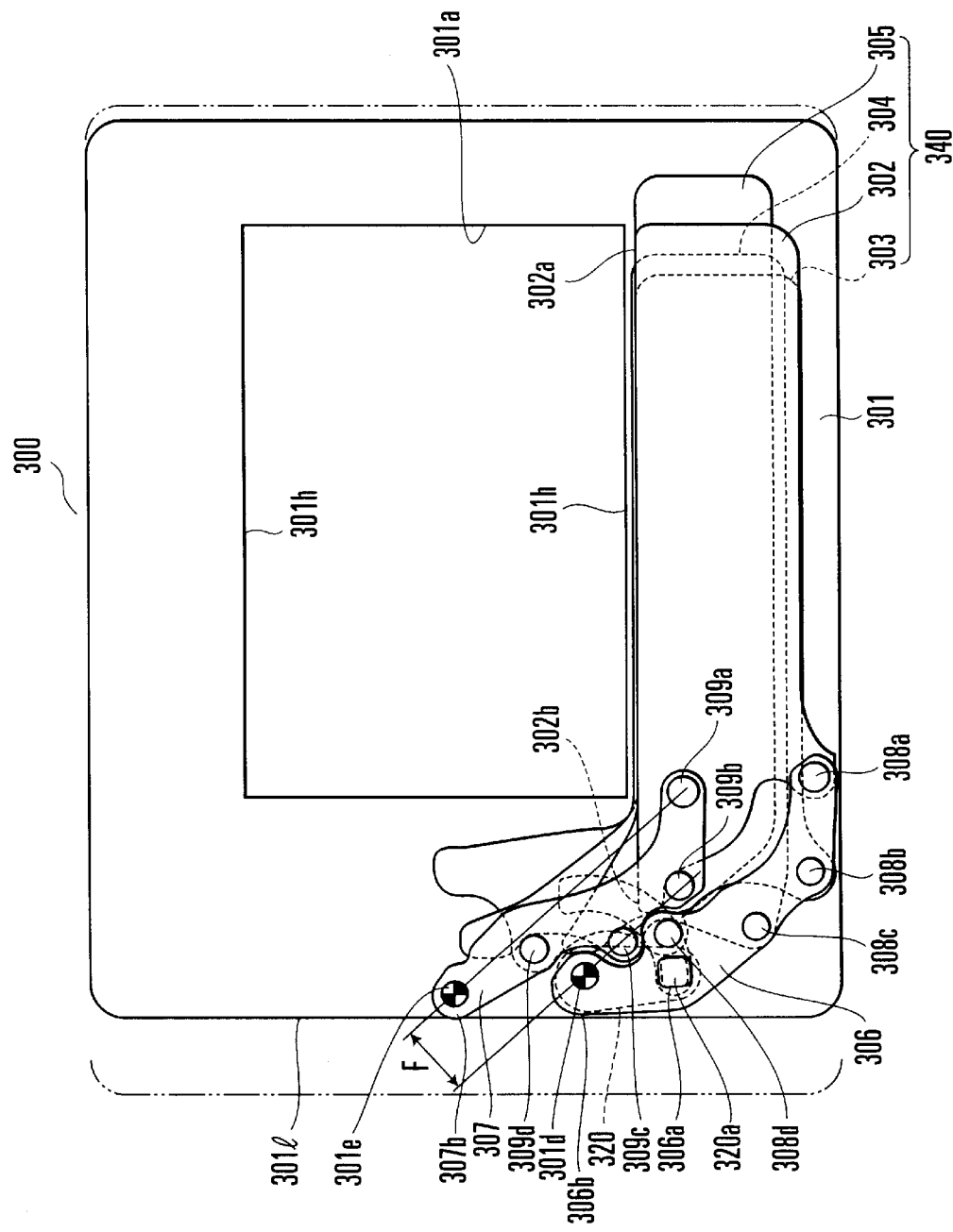
FIG. 14 is a front view showing the shutter device which is the second embodiment as in an open state.

FIGS. 13 and 14 show the arrangement of the shutter 300. FIG. 13 shows the shutter 300 as in a closed state to shield the image plane of the SLM 320 from external light. FIG. 14 shows the shutter 300 as in an open state to permit viewing an image displayed on the image plane of the SLM 329.

In FIGS. 13 and 14, reference numeral 301 denotes a shutter base plate. The shutter base plate 301 has a shutter aperture 301a formed approximately in the middle part thereof. An arcuate slot 301b is formed in the shutter base plate 301 on one of two sides (on the left side), of the shutter aperture 301a. The slot 301b is provided for escaping the moving locus of the driving pin 320a of a driving lever 320 which is arranged to drive a blade unit. The driving lever 320 is arranged to be swingable on a swinging shaft which is not shown but is formed coaxially with a shaft 301 by extending the latter. A driving force generated by a motor 333 is transmitted through a gear train 334 (indicated with a two-dot chain line in FIG. 11) to the driving lever 320 to drive the lever 320 to swing.

A first (light blocking) blade 302 has a light blocking edge formed to longitudinally extend (in the lateral direction). A light blocking edge part 302b is formed by extending the light blocking edge 302a to the left. In other words, the light blocking edge part 302b is an end part on one side of the light blocking blade. Cover (light blocking) blades 303, 304 and 305 are second, third and fourth blades.

A first arm 306 is swingably mounted on a shaft 301d which is formed on the shutter base plate 301. A left side part of the first blade 302 is swingably connected by a caulking dowel 308a to the fore end part of the first arm 306.

A hole 306a is formed in the first arm 306 to have the driving pin 320a of the driving lever 320 tightly engage it without rattling by penetrating through it in the direction of driving. With the driving pin 320a thus allowed to engage the hole 306a, a driving force is transmitted from the driving lever 320 to drive the first arm 306 to swing.

A second arm 307 has its base end part 307b swingably mounted on a shaft 301e formed on the shutter base plate 301. A left side part of the first blade 302 is swingably connected by a caulking dowel 309a to the fore end part of the second arm 307. A parallel link is formed by the first blade 302 and the first and second arms 306 and 307 in this manner.

The left side parts of the cover blades 303, 304 and 305 are swingably connected to the intermediate parts of the first arm 306 and those of the second arm 307 by means of caulking dowels 308b, 309b, 308c, 309c, 308d and 309d. A parallel link is thus formed. A blade unit 340 of the shutter device 300 is formed in this manner.

When the shutter device 300 opens the image plane of the SLM 329 by uncovering the latter, as shown in FIG. 14, the light blocking edge part 302b of the first blade 302 is located within the movable area of the driving pin 320. When a blade spreading action of the blade unit begins to close the shutter aperture, the light blocking edge part 302b of the first blade 302 moves to the outside of the movable area of the driving pin 320. Therefore, the light blocking edge part 302b never interferes with the driving pin 320a.

Figure 15:
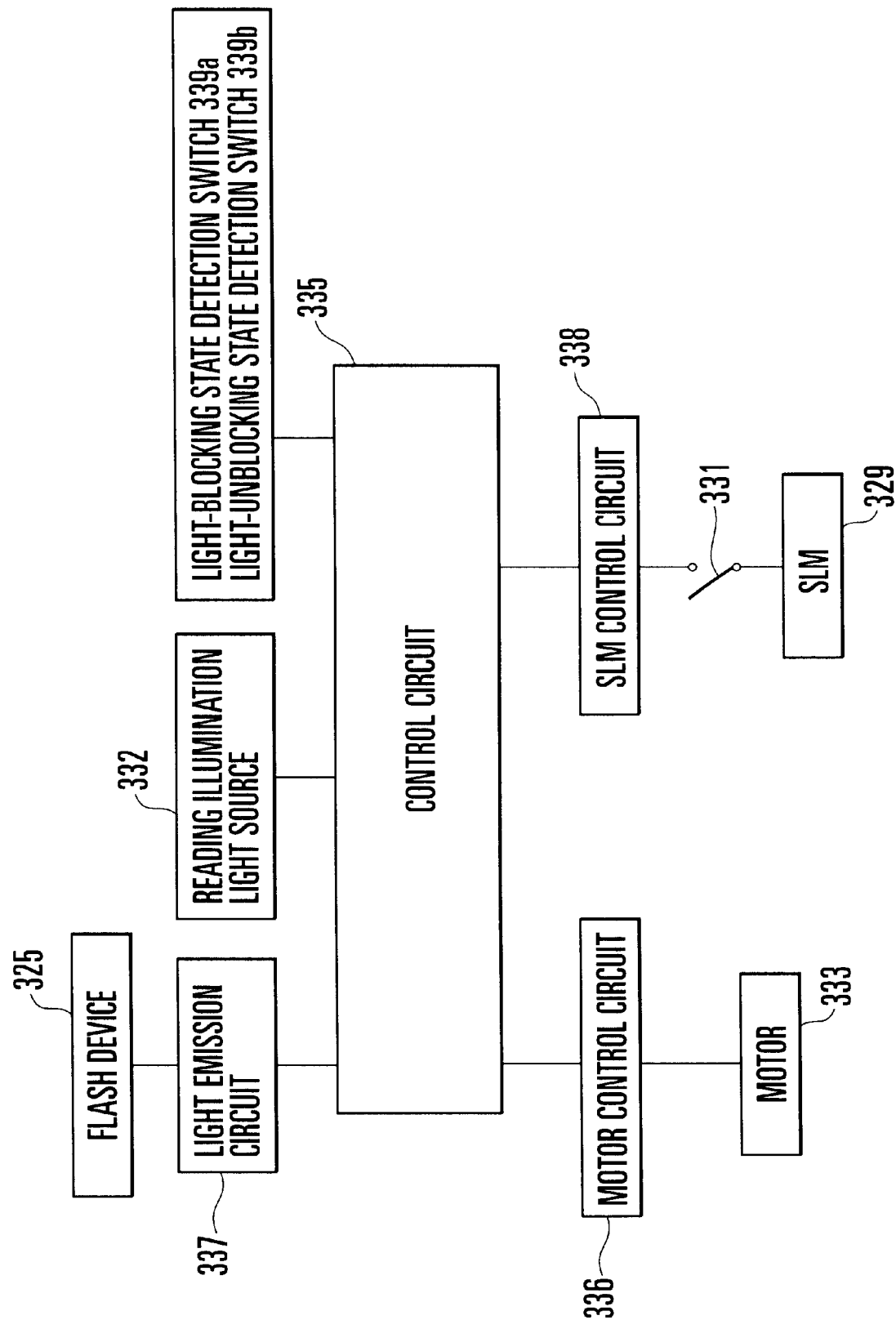
FIG. 15 is a block diagram showing an electric circuit of the above-stated image display apparatus.

FIG. 15 shows the electric circuit arrangement of the image display apparatus 321. The image display device 321 has a control circuit 335 arranged to control a sequence of actions of the whole image display apparatus 321. A motor control circuit 336 controls the forward and reverse rotations of the motor 333, which is a drive source for the shutter device 300. A light emission circuit 337 controls the light emission of the flash device 325. An SLM control circuit 338 controls the switch 331, which is arranged to turn on and off the supply of power to the SLM 329. A light-blocking state detection switch 339a is arranged to turn on when the shutter aperture 301a is completely closed by the blade unit 340. A light-unblocking state detection switch 339b is arranged to turn on when the shutter aperture 301a is completely opened by the blade unit 340.

In FIG. 11, a diffusing plate 341 is arranged on the back side of the SLM 329 to operate in association with the opening and closing actions of the blade unit 340. When the blade unit 340 changes from the closed state to the open state, the diffusing plate 341 is shifted by a sheet driving mechanism (not shown) from such a state as not to cover the back side of the SLM 329 to such a state as to cover the SLM 329. When a reading illumination light source is lighted up with the back side of the SLM 329 covered by the diffusing sheet 341, the illumination light thereof is diffused by the diffusing sheet 341 in such a way as to approximately uniformly illuminate the SLM 329. Then, when the blade unit 340 comes into the closed state, the diffusing sheet 341 is driven in such a way as to retreat from the back side of the SLM 329.

The operation of the image display apparatus 321 (mainly, the control circuit 335) is next described with reference to FIG. 16 which is a flow chart. The flow of procedures of this flow chart begins when the image display apparatus 321 is loaded with the D cartridge 322. At this moment, the shutter aperture 301a is in a state of being completely closed with the blade unit 340. In other words, at this point of time, the image on the SLM 329 can not be seen by the user (observer).

Figure 16:
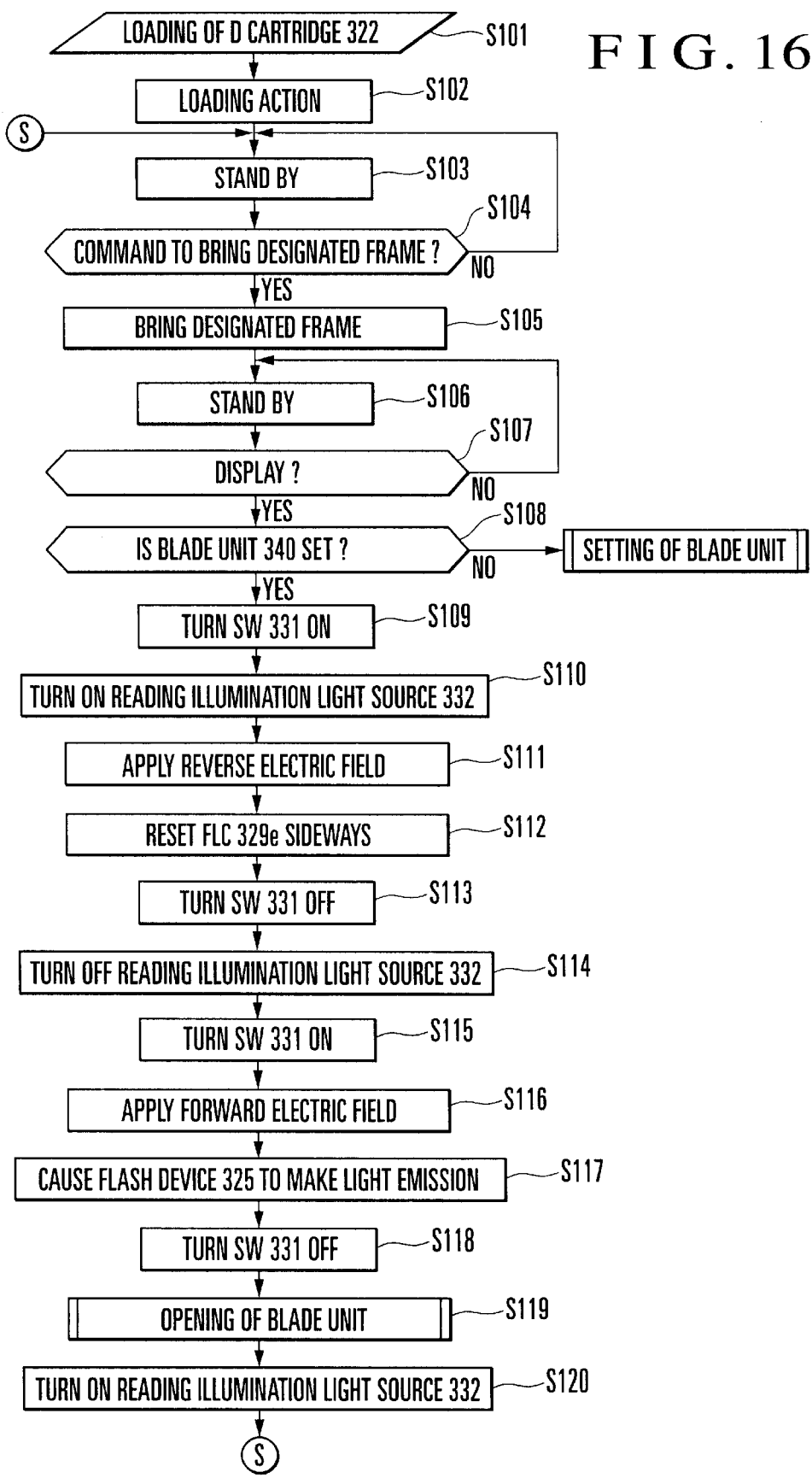
FIG. 16 is a flow chart showing an operation of the same image display apparatus.

Referring to FIG. 16, at step S101, the user loads the image display apparatus with the D cartridge 322 for viewing images existing within the D cartridge 322. At step S102, the control circuit 335 drives the film transport mechanism to perform a thrust action to move the negative film 323 out from the inside of the D cartridge 322. The first frame portion of the film in the D cartridge 322 is then brought to a writing position of the image display apparatus 321. At step S103, the control circuit 335 takes the state of a stand-by mode in which it waits for arrival of a signal from some of switches (not shown).

At step S104, when a signal for advancing the picture on the image plane to the image of a certain frame is received, for example, from a remote control device, the flow of operation proceeds to step S105. At the step S105, the control circuit 335 causes the frame thus designated to be sent to the aperture part of the image display apparatus 321, by operating the film transport mechanism. At step S106, the flow waits for a command as to whether or not this frame is to be displayed.

At step S107, when a display command is received from the user, the flow proceeds to step S108. At the step S108, the control circuit 335 makes a check through the on-state or off-state of the light-blocking state detection switch 339a to find if the blade unit 340 is closed. In other words, in order to erase the image of a frame on display last time and to write a new image in a state of having the shutter aperture 301a completely closed with the blade unit 340, the control circuit 335 makes a check for a closed state of the blade unit 340.

If the light-blocking state detection switch 339a is in the on-state, the flow proceeds to step S109. If the light-blocking state detection switch 339a is in the off-state, the flow proceeds to a "setting of blade unit" subroutine which will be described later herein with reference to FIG. 17.

If the blade unit 340 is found to be in the closed state, the flow proceeds from the step S108 to step S109. At the step S109, the switch 331 is turned on to permit the supply of power. At the next step S110, the reading illumination light source 332 is lighted up. At step S111, an electric field of polarity which is reverse to the polarity of electric field obtained in writing is applied from the AC power source 330.

At step S112, all the cells of the FLC 329e are inverted sideways into a neutral state as indicated at a part of the FLC 329e in FIG. 12(a). At steps S113 and S114, the above-stated frame image erasing action is carried out for a sufficient period of time to make all cells into the above-stated neutral state. After that, the control circuit 335 turns the switch 331 off to put out the reading illumination light source 332.

After the step S114, the flow proceeds to procedures for writing a new frame image on the SLM 329. The current condition of the image display apparatus 321 is assumed to be set, for example, on top of a desk in an office or on a shelf in a house at an ambient brightness measuring approximately several hundred luxes. The brightness of external light is reduced approximately to one half thereof by allowing it to come through the polarizing plate 329h and the liquid crystal layer 329e before it falls on the photoconductor layer 329d '. Under this condition, however, no electric field is applied between the ITO films 329c and 329f as the switch 331 still remains in its off-state. Therefore, the FLC 329e does not react to the incident light.

At step S115, the switch 331 is turned on to bring about an energized state. At step S116, a forward electric field which is required for image writing is applied from the power source 330 to the ITO films 329c and 329f. At step S117, the flash device 325 is caused to emit light. By the light of the flash device 325, an image on the negative film 323 is projected onto the SLM 329. The projected image is written (stored) in the SLM 329.

The light emission from the flash device 325 at the step S117 lasts about 500 μsec. Therefore, the switch 331 is allowed to be in its on state at the step S116 for a period of time which is about the same as the period of light emission. At step S118, after completion of the light emission, the control circuit 335 promptly cuts off the electric field by turning off the switch 331.

Figure 18:
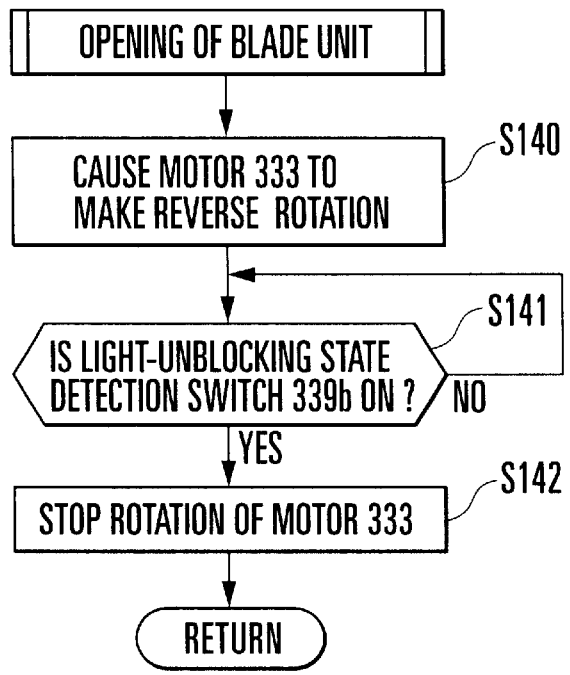
FIG. 18 is a further flow chart showing the operation of the same image display apparatus.

At step S119, the flow proceeds to the "opening of blade unit" subroutine to enable the user to see the image written into the SLM 329 by bringing the shutter unit 340 into the open state. This subroutine is shown in FIG. 18.

At step S120, when the shutter unit 340 comes into the open state, the control circuit 335 causes the reading illumination light source 332 to light up to enable the user to view the image written in the SLM 329 with the aid of transmitted illumination. After that, the flow comes into the standby state (step S103) to wait for the next command.

Figure 17:
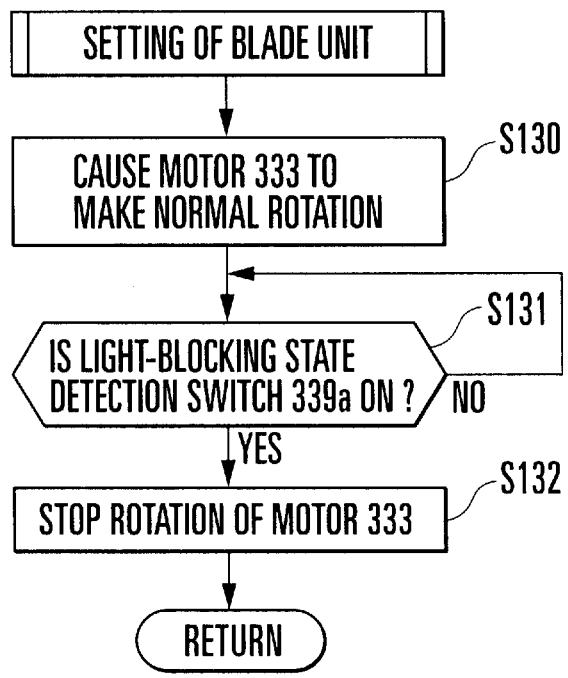
FIG. 17 is another flow chart showing the operation of the same image display apparatus.

The "setting of blade unit" subroutine is next described referring to FIG. 17, which is a flow chart. At step S130 of FIG. 17, to close the shutter from the open state into the closed state, the control circuit 335 causes the motor 333 to make forward rotation. The normal rotation of the motor 333 is transmitted, through the gear train 334 and the driving lever 320, to the first arm 306 shown in FIG. 14 to cause the first arm 306 to swing on the shaft 301d counterclockwise as viewed in FIG. 14. The first arm 304 then causes the blade unit 340 to shift its position from the open state (blade superposing state) shown in FIG. 14 to the closed state (blade spreading state) shown in FIG. 13. Further, in association with the closing action of the blade unit 340, the sheet driving mechanism causes the diffusing sheet 341 to retreat from such a position as to cover the SLM 329, thereby enabling image writing on the SLM 329. The light-blocking state detection switch 339a turns on from its off-state at about the same time as the completion of the closing action of the blade unit 340. At step S131, the control circuit 335, therefore, makes a check to find if the blade unit 340 has come to its closing position in which the shutter aperture 301a of the image display apparatus 321 is completely closed. If so, the flow proceeds to step S132. At the step S132, the control circuit 335 causes the motor control circuit 336 to output a signal for stopping the motor 333 from rotating, so that the rotation of the motor 333 is brought to a stop. Then, this subroutine comes to an end.

The "opening of blade unit" subroutine is next described below referring to the flow chart of FIG. 18. At step S140 of FIG. 18, to bring the blade unit 340 into the open state, the control circuit 335 causes the motor 333 to make reverse rotation. The reverse rotation of the motor 333 is transmitted to the first arm 306 shown in FIG. 13 through the gear train 334 and the driving lever 320. The first arm 306 then swings clockwise on the shaft 301d as viewed in FIG. 13. This causes the blade unit 340 to shift its position from the closed position (blade spreading state) shown in FIG. 13 to the open state (blade superposing state) shown in FIG. 14. Further, in association with the opening action of the blade unit 340, the sheet driving mechanism drives the diffusing sheet 341 to such a position as to cover the SLM 329, so that the illumination light of the reading illumination light source 332 is diffused by the diffusing sheet 341 to approximately uniformly illuminate the SLM 329, thereby enabling a sharp image without unevenness to be observed. Then, the light-unblocking state detection switch 339b turns on from its off-state at about the same time as when the blade unit 340 comes into the open state (light-unblocking state). At step S141, the control circuit 335, therefore, makes a check to find if the blade unit 340 has opened the shutter aperture 301a of the image display apparatus 321. If so, the flow proceeds to step S142. At the step S142, the control circuit 335 causes the motor control circuit 336 to output a signal for stopping the motor 333 from rotating, so that the rotation of the motor 333 is brought to a stop. Then, this subroutine comes to an end.

The image display apparatus according to the second embodiment is thus arranged to prevent external light from coming to the SLM 329 by bring the blade unit 340 into the closed state in writing an image into the SLM 329. The arrangement effectively eliminates image noises due to external light, which hitherto occur in the conventional image display apparatuses arranged to write images with the SLM 329 left exposed to external light. Therefore, while it has been necessary to project a film image by the aid of a large quantity of image writing light from a flash device for obtaining a clear image, the image display apparatus according to the second embodiment obviates the necessity of such a large quantity of light from the flash device 325. As a result, the flash device 325 can be compactly arranged to permit a reduction in size of the image display apparatus 321.

Further, the projection lens 327 does not have to be arranged to have a bright F-number, so that the lens of an image projecting optical system can be designed to have a small outside diameter. Besides, a length of time required in writing an image can be shortened to a great extent.

The shutter device 300 according to the second embodiment of the invention is adapted for the image display apparatus 321 for viewing a display image of the SLM 329 of an image size which, for example, vertically measures 75 mm and laterally 111 mm. The size of the shutter aperture 301a is, therefore, set at a vertical dimension A of 74.1 mm and a lateral dimension of 109.8 mm. For reduction in size of the shutter device 300, it is necessary to make the sizes of component parts disposed around the shutter aperture 301a smaller.

Therefore, referring to FIGS. 13 and 14, points important for reduction in size of the shutter device 300 are described on the following assumption. The width of a part of the shutter base plate 301 on the left side of the shutter aperture 301a in the lateral direction (distance between the left end face of the shutter aperture 301a and the left end face of the shutter base plate 301) is assumed to be B. The width of a part of the shutter base plate 301 on the right side of the shutter aperture 301a in the lateral direction (distance between the right end face of the shutter aperture 301a and the right end face of the shutter base plate 301 is assumed to be C. A distance between the centers of swinging shafts 301d and 301e of the arm base end parts and the centers of swing of caulking dowels 309a and 309b connecting the first blade 302 to the fore ends of the arms is assumed to be D. A maximum operating angle around the swinging shafts 301d and 301e of the arms 306 and 307 is assumed to be θ. A distance between the first and second arms 306 and 307 forming a parallel link (a distance between the swinging shafts 301d and 301e) is assumed to be E.

In FIGS. 13 and 14, a two-dot chain line denotes the outside shape of the conventional blade unit. As shown, the shutter device 300 according to the second embodiment, which is of the same structural arrangement as the first embodiment of the invention, can be arranged to be shorter in lateral dimension by 18 mm than the conventional blade unit.

In the second embodiment, the blade unit 340 is arranged such that, similarly to the first embodiment, caulking dowels, etc., are situated alternately in place in the blade superposing state, so that it is possible to greatly increase the swinging angle of the arms. Further, in the blade superposing state, the caulking dowels 308c, 309c, 308d and 309d of two blades (third and fourth blades) disposed on the side nearer to the arm base end part can be disposed near to the left end part 3011 of the shutter base plate 311 and along the left end part 3011, so that each of the distance between the caulking dowels 308c and 308d in the lateral direction and the distance between the caulking dowels 309c and 309d in the lateral direction is 1.32 mm. Further, taking into consideration the angle for overcharging up to 4°, these distances in the lateral direction in the blade superposing state can be set to almost 0 mm. Accordingly, it is possible to greatly reduce the size of the shutter device 300 in a direction (in the lateral direction) perpendicular to the blade traveling direction.

Then, the above-mentioned viewpoint (including the disposition of caulking dowels), the above-mentioned dimensions C to E and the maximum operating angle θ of the arm are the same as those described in the first embodiment, and the relation formulas (1) to (5) derived in the first embodiment are also applied to the shutter device 300 according to the second embodiment.

Further, also in the shutter device 300 according to the second embodiment, similarly to the first embodiment, these values must be decided in such a combination that gives good balance. Then, the dimension D and the angle θ are important for reduction in size. The distance E is adjusted to avoid interference of caulking dowels and for maintaining the parallelism of the first blade 302. Further, the allocation of the caulking dowels is adjusted also to avoid interference of caulking dowels etc., and to secure an adequate light blocking power by retaining a sufficient amount of overlapping the blades. The dimensions B and C are derived from the values D, θ and E.

Further, in the shutter device 300 according to the second embodiment, to prevent operation interference, the movable area of the part where the driving lever 320 and the arm 306 engage each other is arranged to be used in common, with a time difference, as the movable area of the light blocking edge part 302b of the first blade 302. This arrangement permits the extending amount of the light blocking edge part 302b which can be also effectively used for reduction in size in the direction perpendicular to the blade traveling direction. This arrangement permits not only shortening the arm length of the short arm type having a large arm swinging angle but also adjustment to avoid interference of the caulking dowels and securing a sufficient amount of overlapping blades for blocking light. Further, the parallelism of the blade unit 340 can be prevented from deteriorating by increasing the arm linking distance. Besides, the shutter device 300 can be compactly arranged to lessen an operation resistance and inertia for a high speed operation, without making the structural arrangement of the blade unit 340 complex. The arrangement effectively permits reduction in size and particularly in the direction orthogonally intersecting the direction of travel of the shutter blades.

Further, if the driving speed of the blade unit 340 does not have to be increased by taking the advantage of the small inertia of the blade unit 340 and that the conventional driving speed is acceptable, the necessary amount of shutter driving energy decreases to permit simplification and reduction in thickness of a driving mechanism for the motor 333, the gear train 334, etc., so that the image display apparatus 321 can be compactly arranged.

Incidentally, in each of the first and second embodiments, a shutter device arranged to cause light blocking blade groups for the respective leading curtain and trailing curtain to travel or a shutter device arranged to cause a pair of light blocking blade groups to travel has been described. However, the invention can be applied to a shutter device arranged to cause one light blocking blade for the leading curtain and one light blocking blade for the trailing curtain to travel or a shutter device arranged to cause only one light blocking blade to travel.

Further, in each of the first and second embodiments, a shutter device for cameras or a shutter device for image display apparatuses has been described. However, the shutter device according to the invention can be applied also to apparatuses other than cameras or image display apparatuses.

What is claimed is:

1. A shutter device, comprising:
   a shutter base plate having a shutter aperture;
   a plurality of shutter blades; and
   an arm member arranged to swing on a predetermined shaft provided on said shutter base plate, said arm member being connected to each of said plurality of shutter blades so as to cause the shutter blades to travel over the shutter aperture when said arm member swings on said predetermined shaft,
   wherein, when a distance to said predetermined shaft from a connection part located farthest from said predetermined shaft among connection parts where the shutter blades are connected to said arm member is D, and the length of the shutter aperture in the direction of travel of the shutter blades is A, the following condition is satisfied:

$0.78 A \leq D \leq 0.90 A$.

2. A shutter device according to claim 1, wherein, when a maximum angle of swing of said arm member is θ, the following condition is satisfied:

$80° \leq \theta \leq 94°$.

3. A shutter device according to claim 1, further comprising:
   a second arm member arranged to swing on a second shaft, different from the predetermined shaft, and connected to each of said plurality of shutter blades,
   wherein, when a distance between said predetermined shaft and said second shaft is E, and the length of the shutter aperture in the direction of travel of the shutter blades is A, the following condition is satisfied:

$0.33 A \leq E \leq 0.39 A$.

4. A shutter device according to claim 1, wherein, when a distance from an end face of said shutter base plate at which the center of swing of said arm member is provided to an end face of the shutter aperture is B, the following condition is satisfied:

$0.56 A \leq B \leq 0.70 A$.

5. A shutter device according to claim 1, wherein, when a distance from an end face of said shutter base plate at which the center of swing of said arm member is not provided to an end face of the shutter aperture is C, the following condition is satisfied:

$0.24 A \leq C \leq 0.30 A$.

6. A shutter device, comprising:
   a shutter base plate having a shutter aperture;
   a plurality of shutter blades; and
   an arm member arranged to swing on a predetermined shaft which is provided as a center of swing on said shutter base plate, said arm member being connected to each of said plurality of shutter blades so as to cause the shutter blades to travel over the shutter aperture when said arm member swings on said predetermined shaft,
   wherein, when a maximum angle of swing of said arm member is θ, a distance to said predetermined shaft from a connection part located farthest from said predetermined shaft among connection parts where the shutter blades are connected to said arm member is D, and the length of the shutter aperture in the direction of travel of the shutter blades is A, the following conditions are satisfied:

$80° \leq \theta \leq 94°$; and $0.78 A \leq D \leq 0.90 A$.

7. A shutter device according to claim 6, further comprising:
   a second arm member arranged to swing on a second shaft, different from the predetermined shaft, and connected to each of said plurality of shutter blades,
   wherein, when a distance between said predetermined shaft and said second shaft is E, and the length of the shutter aperture in the direction of travel of the shutter blades is A, the following condition is satisfied:

$0.33 A \leq E \leq 0.39 A$.

8. A shutter device according to claim 6, wherein, when the length of the shutter aperture in the direction of travel of the shutter blades is A, and a distance from an end face of said shutter base plate at which the center of swing of said arm member is provided to an end face of the shutter aperture is B, the following condition is satisfied:

$0.56 A \leq B \leq 0.70 A$.

9. A shutter device according to claim 6, wherein, when the length of the shutter aperture in the direction of travel of the shutter blades is A, and a distance from an end face of said shutter base plate at which the center of swing of said arm member is not provided to an end face of the shutter aperture is C, the following condition is satisfied:

$0.24 A \leq C \leq 0.30 A$.

10. A shutter device, comprising:
    a shutter base plate having a shutter aperture;
    a plurality of shutter blades;
    a first arm member arranged to swing on a predetermined shaft provided on said shutter base plate as a center of swing, said first arm member being connected to each of said plurality of shutter blades; and
    a second arm member arranged to swing on a second shaft, different from the predetermined shaft, said second arm member being connected to each of said plurality of shutter blades, said plurality of shutter blades being arranged to travel over the shutter aperture when said first arm member and said second arm member swing respectively on said predetermined shaft and said second shaft,
    wherein, when a distance between said predetermined shaft and said second shaft is E, and the length of the shutter aperture in the direction of travel of the shutter blades is A, the following condition is satisfied:

$0.33 A \leq E \leq 0.39 A$.

11. A shutter device according to claim 10, wherein an angle of swing of said first arm member is equal to that of said second arm member, and, when a maximum angle of swing of each of said first arm member and said second arm member is θ, the following condition is satisfied:

$80° \leq \theta \leq 94°$.

12. A shutter device according to claim 10, wherein, when a distance to said predetermined shaft from a connection part located farthest from said predetermined shaft among connection parts where the shutter blades are connected to each of said first arm member and said second arm member is D, the following condition is satisfied:

$$0.78\,A \leq D \leq 0.90\,A.$$

13. A shutter device according to claim 10, wherein, when a distance from an end face of said shutter base plate at which the center of swing of each of said first arm member and said second arm member is provided to an end face of the shutter aperture is B, the following condition is satisfied:

$$0.56\,A \leq B \leq 0.70\,A.$$

14. A shutter device according to claim 10, wherein, when a distance from an end face of said shutter base plate at which the center of swing of each of said first arm member and said second arm member is not provided to an end face of the shutter aperture is C, the following condition is satisfied:

$$0.24\,A \leq C \leq 0.30\,A.$$

15. A shutter device, comprising:
a shutter base plate having a shutter aperture;
first, second, third and fourth shutter blades; and
a first arm member arranged to swing on a predetermined shaft provided on said shutter base plate, said first arm member being connected, in the order from the farthest to the nearest to the center of swing of said first arm member, to said first, second, third and fourth shutter blades, one by one, and arranged so as to cause said first, second, third and fourth shutter blades to travel over the shutter aperture when said first arm member swings on said predetermined shaft,
wherein, among distances of connection parts where said first, second, third and fourth shutter blades respectively are connected to said first arm member, with respect to a line segment connecting said predetermined shaft to the connection part where said first shutter blade is connected to said first arm member, the distance from the connection part connecting said third shutter blade to said first arm member is the longest.

16. A shutter device according to claim 15, further comprising a second arm member, said second arm member being connected to said first, second, third and fourth shutter blades.

17. A shutter device according to claim 16, wherein said second arm member has a recessed part formed in a shape that effectively prevents said second arm member from interfering with the connection part where said third shutter blade is connected to said first arm member.

18. A shutter device, comprising:
a shutter base plate having a shutter aperture;
a plurality of shutter blades;
a first arm member arranged to swing on a predetermined shaft provided on said shutter base plate as a center of swing, said first arm member being connected to each of said plurality of shutter blades;
a second arm member arranged to swing on a second shaft, different from the predetermined shaft, said second arm member being connected to each of said plurality of shutter blades, and
a driving member arranged to drive said first arm member to swing on the center of swing, wherein a shutter blade which determines the shape of the shutter aperture from among said plurality of shutter blades has a blade end thereof, on the side where said predetermined shaft and said second shaft are located, arranged to be located within a driving area of said driving member when all of said plurality of shutter blades are in an overlapped state and to part from the driving area when said plurality of shutter blades are in a state of being driven by said driving member.

19. A shutter device according to claim 18, wherein said plurality of shutter blades constitute a trailing curtain shutter unit which is arranged to close the shutter aperture, and said shutter device further comprises a leading curtain shutter unit which is arranged to bring the shutter aperture from a closed state to an open state before said trailing curtain shutter unit is driven by said driving member.

20. A shutter device according to claim 18, further comprising second driving means for driving an arm member which is connected to a plurality of shutter blades of said leading curtain shutter unit.

21. An image display apparatus comprising:
a display screen; and
a projection system including a shutter device, the shutter device comprising:
a shutter base plate having a shutter aperture;
a plurality of shutter blades; and
an arm member arranged to swing on a predetermined shaft provided on said shutter base plate, said arm member being connected to each of said plurality of shutter blades so as to cause the shutter blades to travel over the shutter aperture when said arm member swings on said predetermined shaft,
wherein, when a distance to said predetermined shaft from a connection part located farthest from said predetermined shaft among connection parts where the shutter blades are connected to said arm member is D, and the length of the shutter aperture in the direction of travel of the shutter blades is A, the following condition is satisfied:

$$0.78\,A \leq D \leq 0.90\,A.$$

22. A shutter device, comprising:
a shutter base plate having a shutter aperture;
a plurality of shutter blades; and
an arm member arranged to swing on a predetermined shaft provided on said shutter base plate, said arm member being connected to each of said plurality of shutter blades so as to cause the shutter blades to travel over the shutter aperture when said arm member swings on said predetermined shaft,
wherein, when a distance to said predetermined shaft from a connection part located farthest from said predetermined shaft among connection parts where the shutter blades are connected to said arm member is D, and the length of the shutter aperture in the direction of travel of the shutter blades is A, the following condition is satisfied:

$$D \leq 0.90\,A.$$

* * * * *

UNITED STATES PATENT AND TRADEMARK OFFICE
CERTIFICATE OF CORRECTION

PATENT NO. : 6,637,955 B2
DATED : October 28, 2003
INVENTOR(S) : Yasuhiro Toyoda It is certified that error appears in the above-identified patent and that said Letters Patent is hereby corrected as shown below:

Column 1,
Line 35, "the.blade" should read -- the blade --.

Column 2,
Line 23, "training" should read -- trailing --.
Line 28, "may" should read -- maybe --.
Line 29, "be" should be deleted.

Column 4,
Line 4, "dose" should read -- does --.
Line 45, "arm" should read -- arms --.

Column 10,
Line 41, "id" should read -- 1d --.
Lines 51 and 63, "tailing" should read -- trailing --.

Column 11,
Line 10, "tailing" should read -- trailing --.

Column 12,
Line 23, "part 1011" should read -- 101$l$ --.
Line 34, "follow." should read -- follows. --.
Line 54, "become 0.77." should read -- become 0.77mm. --.

Column 13,
Line 49, "folded, state" should read -- folded state, --.

Column 15,
Line 4, "on" should read -- one --.
Line 63, "of" should read -- of the --.

Column 18,
Line 4, "la" should read -- 1a --.
Line 32, "on" should read -- in --.

Column 19,
Line 6, "overlap" should read -- overlaps --.

UNITED STATES PATENT AND TRADEMARK OFFICE
CERTIFICATE OF CORRECTION

PATENT NO. : 6,637,955 B2
DATED : October 28, 2003
INVENTOR(S) : Yasuhiro Toyoda It is certified that error appears in the above-identified patent and that said Letters Patent is hereby corrected as shown below:

Column 20,
Line 14, "4 degree." should read -- 4 degrees. --.
Line 55, "of cameras of these days has come to be" should read -- cameras, these days, are --.
Line 56, "rubber coated" should read -- rubber-coated --.
Line 58, "Some of cameras also has come to be" should read -- Also, some cameras are --.

Column 21,
Line 11, "if" should read -- 1f --.
Line 12, "tailing" should read -- trailing --.

Column 22,
Line 50, delete "a".

Column 26,
Line 55, "switches" should read -- the switches --.

Column 27,
Line 38, "layer 329d'." should read -- layer 329d. --.

Column 28,
Line 59, "bring" should read -- brining --.

Column 29,
Line 57, "3011 of" should read -- 301*l* of --.
Line 58, "3011, so" should read -- 301*l*, so --.

Signed and Sealed this

Fifteenth Day of June, 2004

JON W. DUDAS
*Acting Director of the United States Patent and Trademark Office*